United States Patent
Sharma et al.

(10) Patent No.: US 10,860,449 B2
(45) Date of Patent: Dec. 8, 2020

(54) ADJUSTABLE RETIMER BUFFER

(71) Applicant: Intel Corporation, Santa Clara, CA (US)

(72) Inventors: Debendra Das Sharma, Saratoga, CA (US); Daniel S. Froelich, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 738 days.

(21) Appl. No.: 15/476,571

(22) Filed: Mar. 31, 2017

(65) Prior Publication Data

US 2018/0285227 A1    Oct. 4, 2018

(51) Int. Cl.
| | |
|---|---|
| *G06F 11/30* | (2006.01) |
| *H04L 1/20* | (2006.01) |
| *H04L 29/06* | (2006.01) |
| *H04L 29/08* | (2006.01) |
| *H04L 12/933* | (2013.01) |
| *H04L 12/26* | (2006.01) |
| *H04L 1/18* | (2006.01) |

(52) U.S. Cl.
CPC ...... *G06F 11/3006* (2013.01); *G06F 11/3027* (2013.01); *G06F 11/3037* (2013.01); *G06F 11/3041* (2013.01); *G06F 11/3079* (2013.01); *H04L 1/20* (2013.01); *H04L 43/0823* (2013.01); *H04L 49/10* (2013.01); *H04L 69/02* (2013.01); *H04L 69/323* (2013.01); *H04L 1/1835* (2013.01); *H04L 43/10* (2013.01)

(58) Field of Classification Search
CPC ............. G06F 11/3006; G06F 11/3027; G06F 11/3037; G06F 11/3041; G06F 11/3079; H04L 1/20; H04L 43/0823; H04L 49/10; H04L 69/02; H04L 69/323; H04L 1/1835; H04L 43/10
See application file for complete search history.

(56) References Cited

U.S. PATENT DOCUMENTS

| | | | |
|---|---|---|---|
| 4,945,548 A * | 7/1990 | Iannarone | G06F 5/14 370/506 |
| 7,474,612 B1 * | 1/2009 | Patel | H04J 3/062 370/217 |

(Continued)

FOREIGN PATENT DOCUMENTS

WO    2016039791 A1    3/2016

OTHER PUBLICATIONS

International Search Report and Written Opinion in International Application No. PCT/US2018/019896, dated Jun. 12, 2018, 9 pages.

(Continued)

*Primary Examiner* — Kyle Vallecillo
(74) *Attorney, Agent, or Firm* — Alliance IP, LLC

(57) ABSTRACT

A retimer device is provided that includes an elasticity buffer, a receiver, and a controller. The elasticity buffer adds or subtracts data in the elasticity buffer to compensate for different bit rates of two devices to be connected over a link, where the retimer is positioned between the two devices on the link. The receiver receives a data stream to be sent between the two devices on the link. The controller determines, from the data stream, a modification to one or more characteristics of the link, and causes size of the elasticity buffer to be changed from a first size to a second size based on the modification.

20 Claims, 13 Drawing Sheets

(56) References Cited

U.S. PATENT DOCUMENTS

| | | | | |
|---|---|---|---|---|
| 8,041,853 | B2* | 10/2011 | Castellano | G06F 5/12 710/29 |
| 8,767,756 | B2* | 7/2014 | Black | H04L 12/4637 370/403 |
| 9,673,963 | B1* | 6/2017 | Ribo | H04L 7/0025 |
| 2009/0074408 | A1* | 3/2009 | Black | H04L 12/4625 398/45 |
| 2010/0315135 | A1* | 12/2010 | Lai | G06F 5/06 327/145 |
| 2013/0007489 | A1 | 1/2013 | Unnikrishnan et al. | |
| 2015/0363350 | A1* | 12/2015 | Yeung | G06F 13/4221 710/106 |
| 2016/0028537 | A1* | 1/2016 | Erdogan | H03L 7/0816 375/374 |
| 2016/0147606 | A1* | 5/2016 | Arroyo | G06F 13/4022 714/5.11 |
| 2016/0147681 | A1 | 5/2016 | Arroyo et al. | |
| 2016/0147697 | A1* | 5/2016 | Arroyo | G06F 9/44505 710/104 |
| 2016/0147705 | A1* | 5/2016 | Arroyo | G06F 13/4027 714/15 |
| 2016/0182186 | A1 | 6/2016 | Adler et al. | |
| 2017/0017604 | A1* | 1/2017 | Chen | G06F 11/3051 |
| 2017/0019247 | A1 | 1/2017 | Iyer et al. | |
| 2017/0031863 | A1* | 2/2017 | Glaser | G06F 1/12 |
| 2017/0039162 | A1* | 2/2017 | Mishra | G06F 13/385 |
| 2017/0116090 | A1* | 4/2017 | Arroyo | G06F 11/1616 |
| 2017/0286359 | A1* | 10/2017 | McGowan | G06F 13/4291 |
| 2019/0028262 | A1* | 1/2019 | Kobayashi | H04L 7/0331 |

OTHER PUBLICATIONS

International Preliminary Report on Patentability issued in International Patent Application No. PCT/US2018/019896, dated Oct. 1, 2019; 7 pages.

* cited by examiner

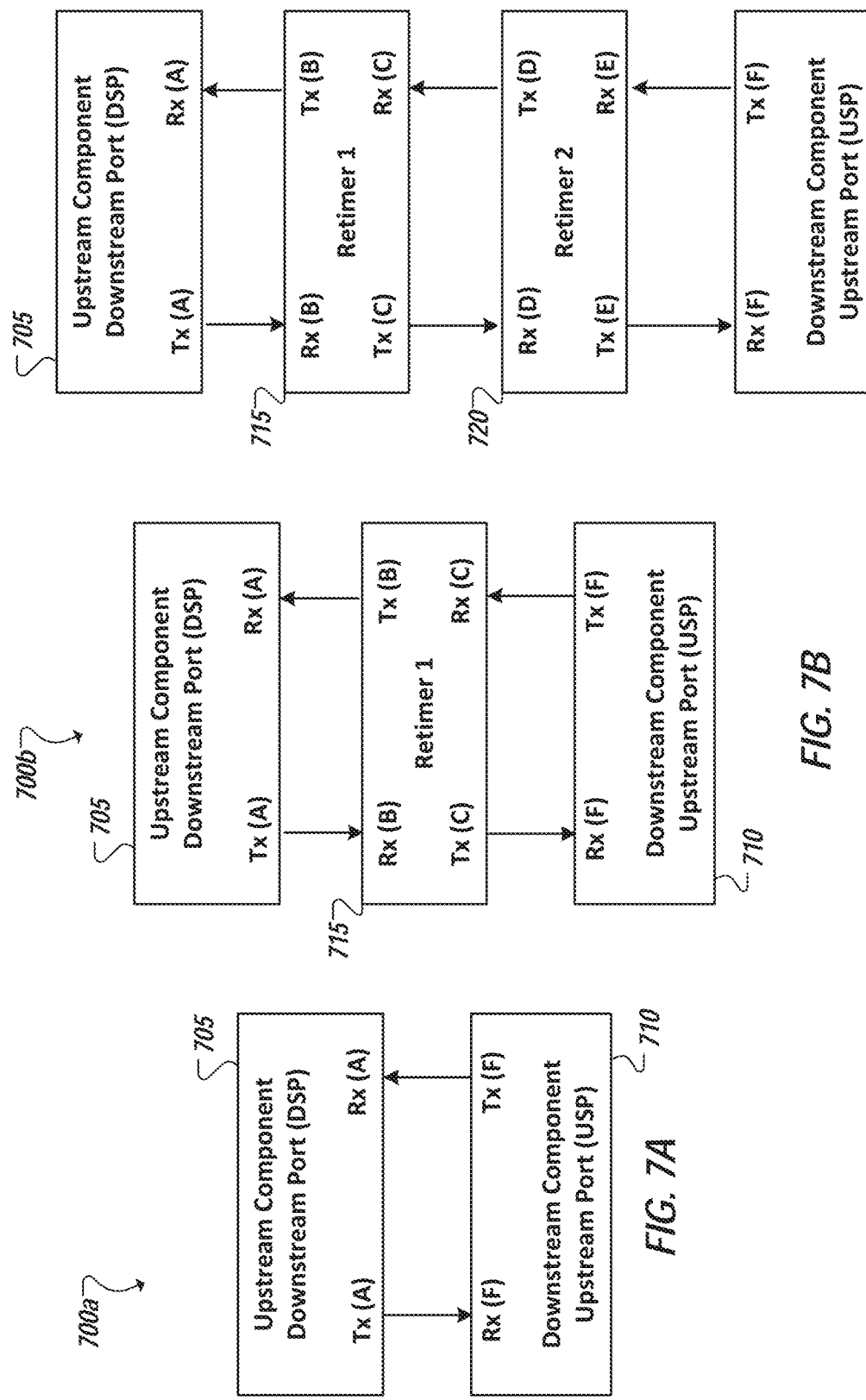

ADJUSTABLE RETIMER BUFFER

FIELD

This disclosure pertains to computing system, and in particular (but not exclusively) to retimers in interconnects.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIGS. 7A-7C illustrate simplified block diagrams of example implementations of a test mode for determining errors in one or more sublinks of a link.

DETAILED DESCRIPTION

Figure 1:
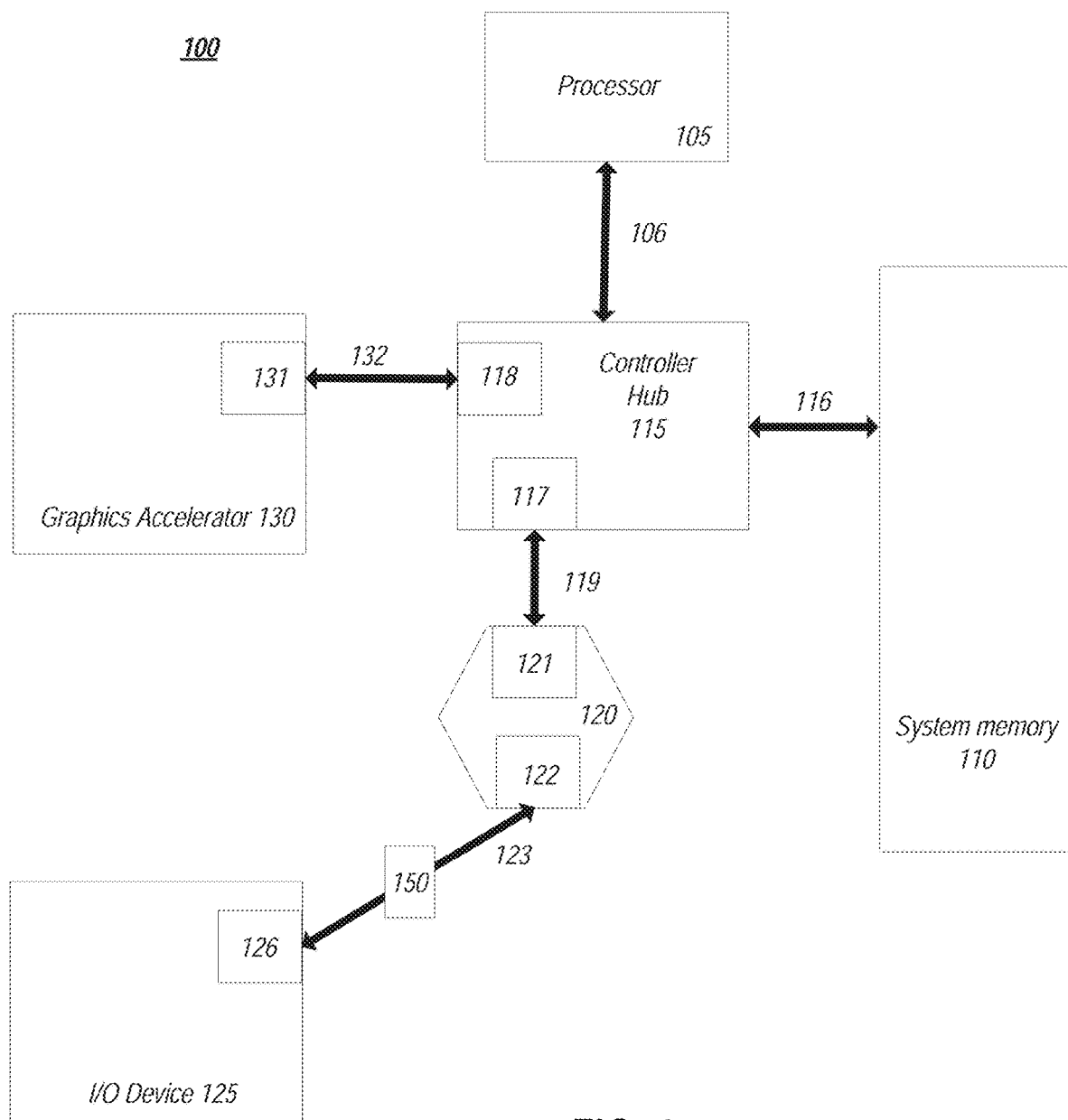
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
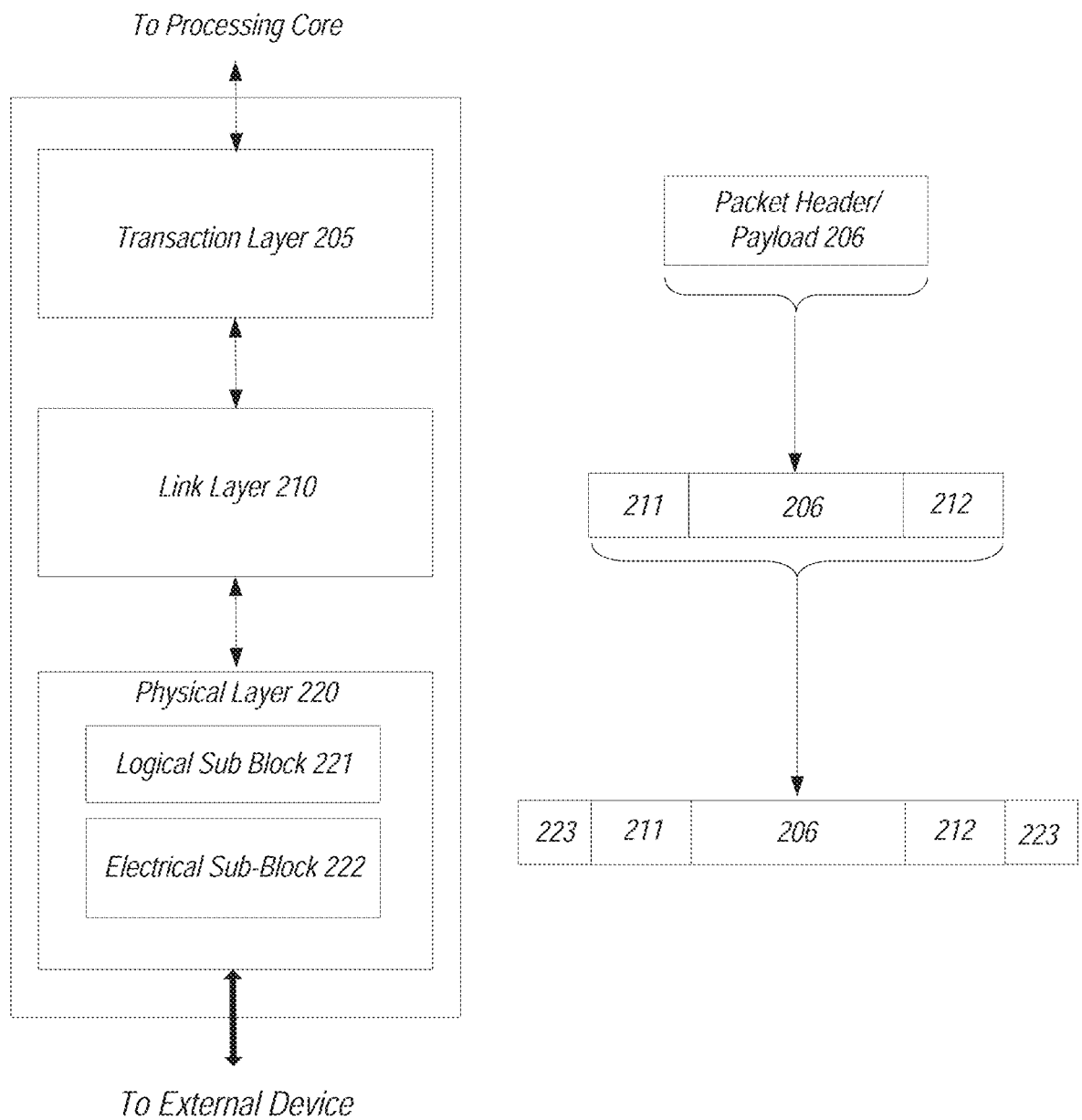
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
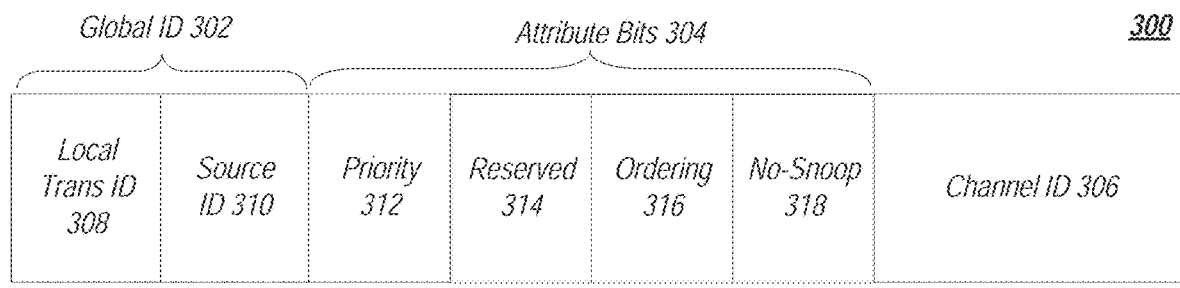
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
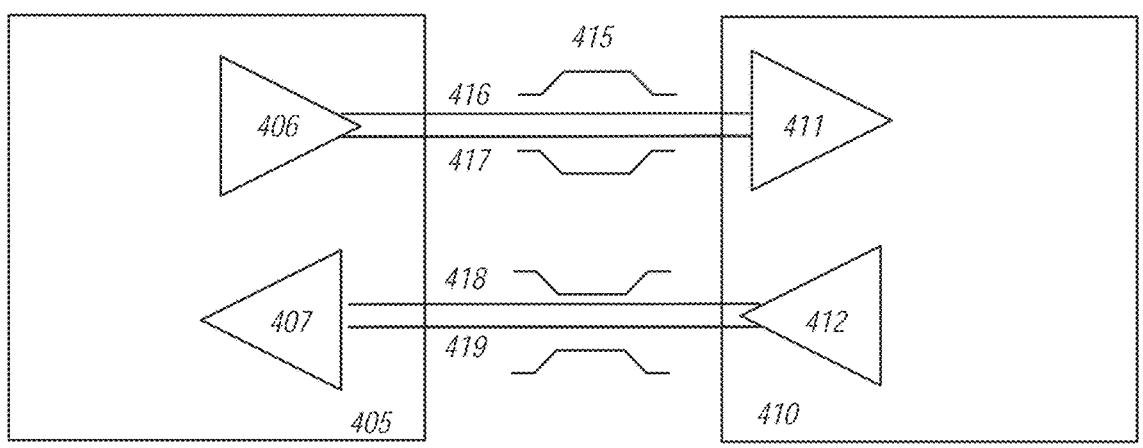
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In one embodiment, Ultra Path Interconnect (UPI) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
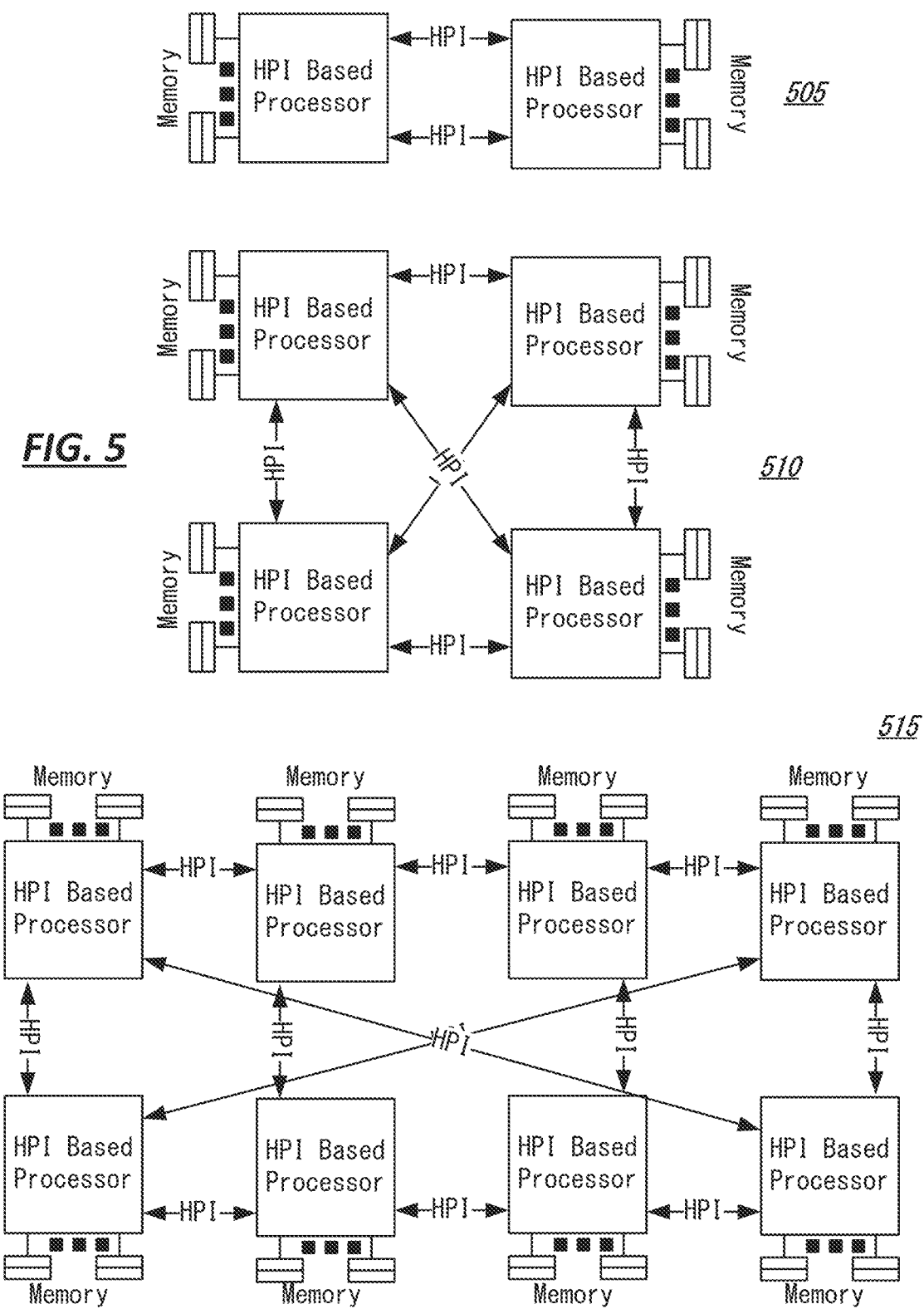
FIG. 5 illustrates embodiments of potential high performance, processor-to-processor interconnect configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 5 illustrates an embodiment of an example UPI layered protocol stack. In some implementations, at least some of the layers illustrated in FIG. 5 may be optional. Each layer deals with its own level of granularity or quantum of information (the protocol layer 620a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

Figure 6:
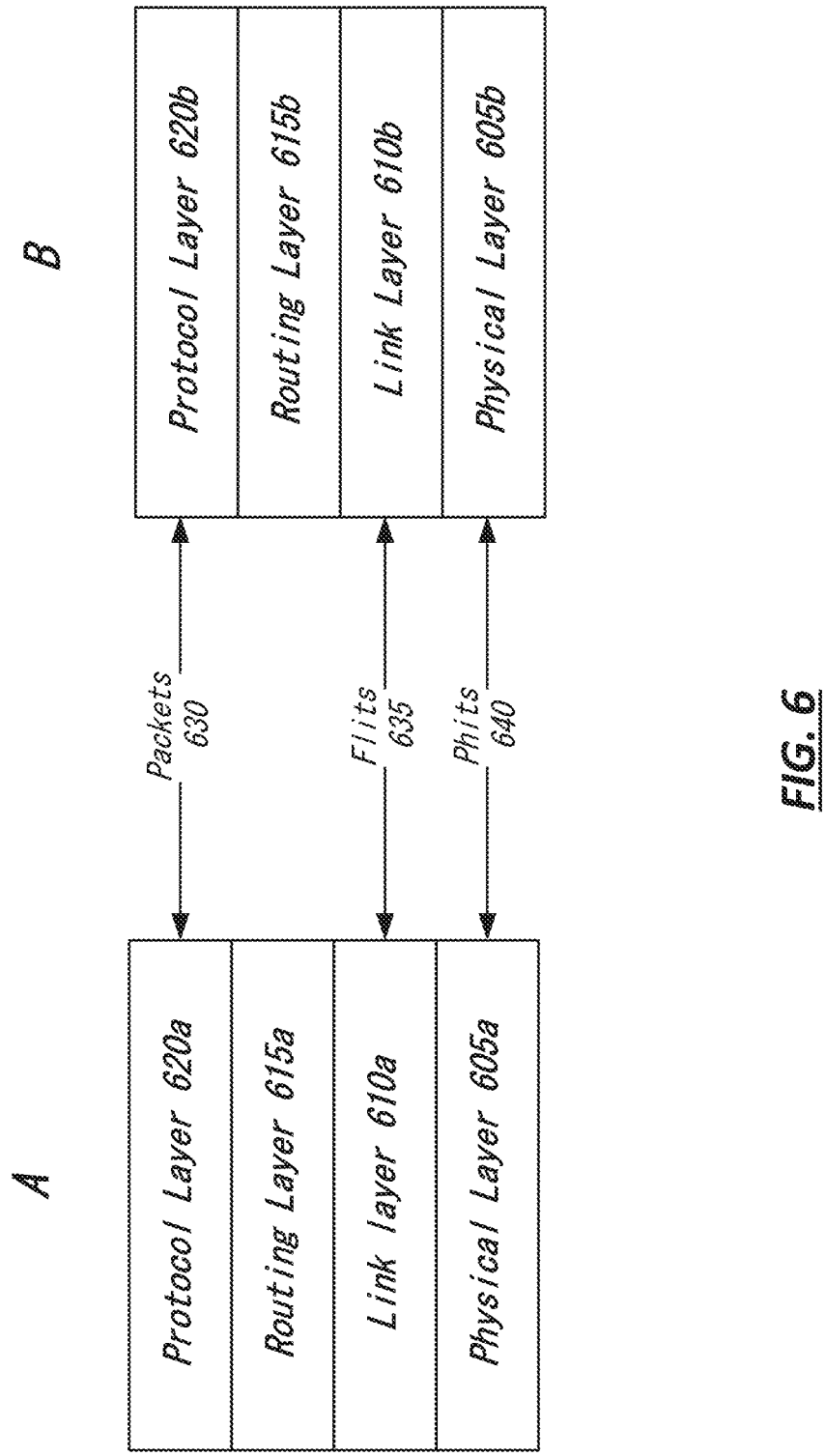
FIG. 6 illustrates an embodiment of a layered protocol stack associated with an interconnect.

The Physical layer 605a,b (or PHY) of UPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In some implementations, UPI can utilize an embedded clock. A clock signal can be embedded in data transmitted using the interconnect. With the clock signal embedded in the data, distinct and dedicated clock lanes can be omitted. This can be useful, for instance, as it can allow more pins of a device to be dedicated to data transfer, particularly in systems where space for pins is at a premium.

In some implementations, a link, such as a link compliant with PCIe, USB, UPI, or other interconnect protocol, can include one or more retimers or other extension devices, such as a repeater. A retimer device (or simply "retimer"), can include active electronic devices that receive and re-transmit (retime) digital I/O signals. Retimers can be used to extend the length of a channel that can be used with a digital I/O bus.

FIGS. 7A-7C are simplified block diagrams 700a-c illustrating example implementations of a link interconnecting two system components, or devices, such as upstream component 705 and downstream component 710. An upstream component 705 and downstream component 710 can be connected directly, in some instances, with no retimers, redrivers, or repeaters disposed on the link between the two components 705, 710, such as shown in the example of FIG. 7A. In other instances, a retimer (e.g., 715) can be provided to extend the link connecting upstream component 705 and downstream component 710, such as illustrated in FIG. 7B. In still other implementations, two or more retimers (e.g., 715, 720) can be provided in series to further extend a link connecting upstream component 705 and downstream component 710. For instance, a particular interconnect technology or protocol may specify a maximum channel length and one or more retimers (e.g., 715, 720), can be provided to extend the physical length of the channel connecting two devices 705, 710. For instance, providing retimers 715, 720 between upstream component 705 and downstream component 710 can allow a link three times the maximum length specified for a link without these retimers e.g., 715, 720, among other example implementations.

Figures 8A, 8B:
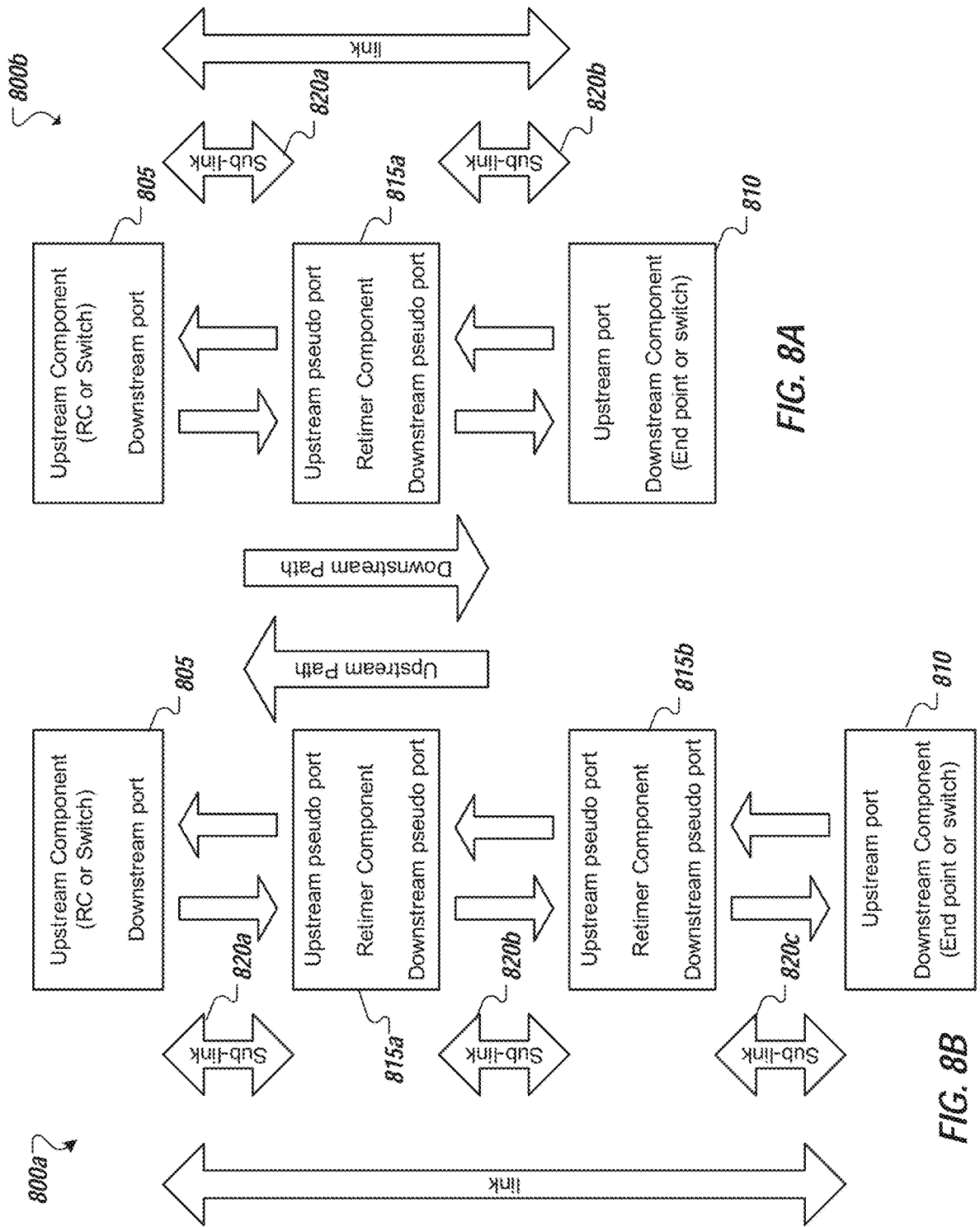
FIGS. 8A-8B illustrate simplified block diagrams of example links including one or more extension devices.

A link incorporating one or more retimers can form two or more separate electrical sub-links at data rates comparable to data rates realized by links employing similar protocols but with no retimers. For instance, a link including a single retimer can form a link with two separate sub-links, each operating at 8.0 GT/s or higher. FIGS. 8A-8B illustrate simplified block diagrams 800a-b of example links including one or more retimers. For instance, in FIG. 8A, a link connecting a first component 805 (e.g., an upstream component) to a second component 810 (e.g., a downstream component) can include a single retimer 815a. A first sublink 820a can connect the first component 805 to the retimer 815a and a second sublink 820b can connect the retimer 815a to the second component. As shown in FIG. 8B, multiple retimers 815a, 815b can be utilized to extend a link. Three sublinks 820a-c can be defined through the two retimers 815a, 815b, with a first sublink 815a connecting the first component to the first retimer 815a, a second sublink connecting the first retimer 815a to the second retimer 815b, and the third sublink 815c connecting the second retimer 815b to the second component.

As shown in the examples of FIGS. 8A-8B, in some implementations, a retimer can include two pseudo ports, and the pseudo ports can determine their respective downstream/upstream orientation dynamically. Each retimer 815a, 815b can have an upstream path and a downstream path. Further, retimers 815a, 815b can support operating modes including a forwarding mode and an executing mode. A retimer 815a, 815b in some instances can decode data received on the sub-link and re-encode the data that it is to forward downstream on its other sublink. In some cases, the retimer can modify some values in the data it receives, such as when processing and forwarding ordered set data. Additionally, a retimer can potentially support any width option as its maximum width, such as a set of width options defined by a specification such as PCIe.

As data rates of serial interconnects (e.g., PCIe, UPI, USB, etc.) increase, retimers are increasingly used to extend the channel reach. Retimers may capture the received bit stream prior to regenerating and re-transmitting the bit stream. In some cases, retimers may be protocol-aware and possess a full physical layer or even protocol stack to allow the retimer to participate in link negotiation (LTSSM), including transmitter/receiver equalization, and other link training activities. However, in high speed links implementing a retimer with a full protocol stack or complete physical or link layer logic, etc., may add unacceptable latency for links that connect two or more devices over one or more retimers. Indeed, there are growing numbers of applications that are likely to utilize retimers or other channel extension devices as the operating frequencies of external interfaces continue to increases while channel improvement improves more at a more modest pace. Further, many applications call for longer channel lengths, such as data center and server applications where interconnect channels can span several inches, pushing or exceeding the maximum channel lengths supported natively by emerging high speed interconnects. For example, PCI Express Gen 4, designed to operate at a frequency of 16.0 GT/s, may provide for a particular limited maximum channel length (e.g., 14" or less). For server applications, where the channel lengths may typically exceed 20 inches, a retimer, redriver, or other repeater elements may be sought after to extend the channel. Similarly, for an Ultra Path Interconnect (UPI) cache-coherent interface, extension devices may be likewise utilized to support longer-length platforms at 10.4 GT/s, among other examples.

Developing and implementing retimers for high speed interfaces may face a variety of issues. For example, in high speed cache-coherency protocols such as UPI, a channel may be extremely sensitive to latency, such that adding additional latency of 30 nsec per retimer hop becomes untenable due to the performance loss introduced through the retimer(s). Latency may also be an issue in examples such as PCIe, such as in memory applications (e.g., Memory Drive and Memory Services Processor), and such challenges are only expected to worsen as the next-generation non-volatile memory (NVM) technologies provide higher bandwidth and lower latency, closing the gap with double data rate (DDR) memory (e.g., DDR synchronous dynamic random-access memory (SDRAM)).

The speed of high speed differential serial links continues to increase. USB 3.1 has a link speed of 10 GT/s and PCI Express 4.0 has a link speed of 16 GT/s, with speeds of future standard and non-standard applications expected to increase further. Notwithstanding these advancements, the physical size of many systems and devices has stayed unchanged—making the high speed differential channels more challenging to design as the I/O speeds increase. Many channel designs now require an active extension device such as a retimer and the percentage of channel designs where an extension device is required are increasing. Extension devices may include such examples as repeaters, redrivers, and retimers. Of these examples, retimers offer the greatest extension (100% per retimer) together with guaranteed interoperability. However, retimers also have some drawbacks versus simpler analog-only redriver extension devices, including increased cost, latency, and power. The latency added by retimers is especially significant in systems that use a clocking architecture where the transmitter and receiver use separate/independent reference clocks that contain low frequency spread spectrum modulation (SSC) to help to pass emissions testing. As an example, in PCI Express, a clocking architecture, Spread Spectrum with Independent SSC (or SRIS) may be adopted. Such a clocking architecture is also adopted in USB 3.0/3.1. In some cases, these clocking architectures may be adopted so that links comply with radio communication rules and standards (e.g., Federal Communication Commission standards), among other reasons. Other clocking architectures of other interconnects may present similar issues.

In many protocols, a retimer is tasked with forwarding all symbols without dropping or adding any symbols except symbols. In some implementations, frequency mismatches may emerge between endpoints connected by a retimer. Such mismatches may be the direct result of modulation schemes applied at the clocks of the endpoints connected over the link. In some implementations, specialized data symbols may be defined, from which bits may be removed or to which bits may be added in order to address the frequency mismatches. For instance, SKIP or SKP ordered sets (OS) may be defined (e.g., in PCIe and USB), which are designed to be modified to compensate for differences in frequencies between bit rates at two ends of a Link. In addition, elastic buffering may be provided to perform this compensation. An elasticity buffer may be provided, in some implementations, in physical layer logic of the receivers of endpoints connected on the link. Likewise, a retimer may also be equipped with an elasticity buffer to handle the periodic compensation of frequency differences between endpoints.

In some implementations, an elasticity buffer of a retimer may be designed to be nominally kept half-full and used to prevent underflow or overflow in the data stream when the independent transmit and receive clocks have a rate difference (e.g., due to the independent reference clocks and spread spectrum modulation). In this example, whenever the buffer gets more than half full the retimer removes SKP symbols from the next SKP ordered set and whenever the buffer gets less than half-full the retimer adds SKP symbols to the next SKP ordered set. For some example protocols, such as PCI Express and USB, the size of the retimer's elasticity buffer may be a function of factors such as the rate SKP ordered sets are transmitted (e.g., based on whether SRIS (or another clock modulation scheme) is applied to the clock), the link width (number of lanes forming the link), and the maximum data packet size (e.g., since SKP ordered sets may not be allowed to be sent in the middle of data packets in some example these protocols (but are to be buffered resulting in multiple SKP ordered sets being sent after the completion of long data packets)), among other examples.

In one illustrative example, in a system utilizing clocks applying SRIS clocking, worst case latency may occur with the SRIS clocking architecture when the link width is x1 and the maximum packet payload size is the maximum value (e.g., 4096 bytes). Given the possibility that such a situation may occur during the life of a link, traditional retimers are implemented with elasticity buffers sized to potentially handle the worst case (e.g., a x1 link and a 4096 byte maximum packet size) to avoid critical errors arising from overflow of the elasticity buffer. However, as a result of sizing retimer elasticity buffers to accommodate worst case conditions on a link, the elasticity buffer may introduce considerable latency, impacting the performance of links on which the retimer is introduced.

In some cases, the link width and maximum packet size of a link may be determined dynamically and may even be changed dynamically (e.g., according to a protocol definition, such as in PCIe). In some implementations, a retimer may be provided with enhanced functionality to detect link width, maximum packet size, and other link attributes and dynamically adapt the size of its elasticity buffer based on these attributes and thereby lower latency introduced through the retimer's elasticity buffer. For instance, an enhanced retimer may dynamically update its elasticity buffer size based on changes to the link width, maximum packet size, clock modulation mode, among other examples. This may result in substantial reductions in retimer latency, among other example advantages.

Figure 9:
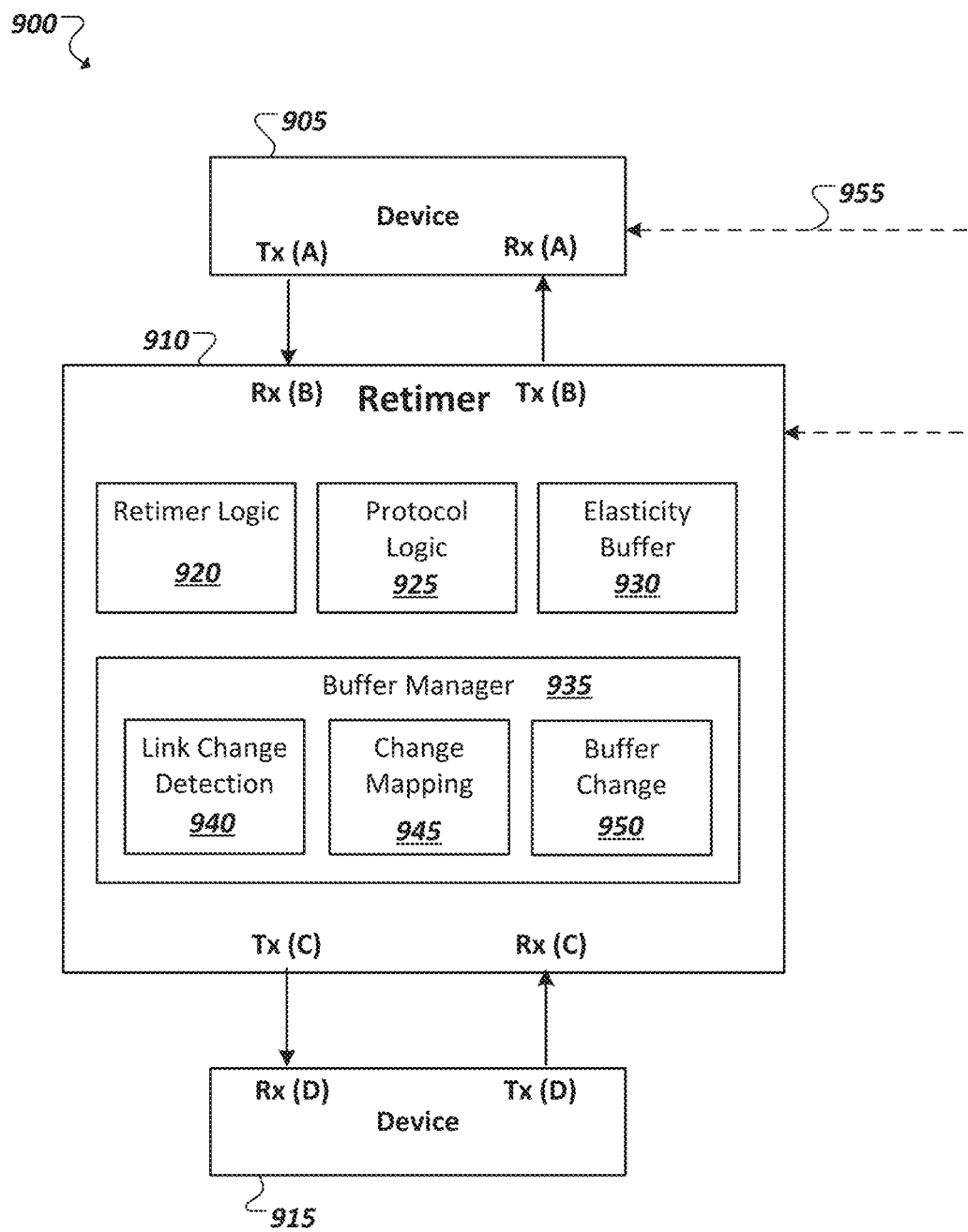
FIG. 9 illustrates a simplified block diagram of an example retimer device.

Turning to FIG. 9, a simplified block diagram 900 is shown illustrating an example implementation of an enhanced retimers equipped with logic to enable the retimer 910 to dynamically adjust the size of buffers (e.g., 930) utilized by the retimer 910 to account for dynamic changes to characteristics of a link. One or more retimer devices 910 may be provided to extend a link connecting two devices (e.g., 905, 915), such as a processor device and an endpoint device, two processor devices, etc. In this example, the retimer(s) 910 may each include retimer logic 920, protocol logic 925, an elasticity buffer 930, and buffer manager 935 logic (e.g., implemented in hardware circuitry, hardware logic, firmware, and/or software) to determine changes to link characteristics and automatically adjust the size of the elasticity buffer 930 based on these changes to the link. In this example, retimer logic corresponding to a single lane of a multiple lane link is shown. Accordingly, the components illustrated in FIG. 9 (and other examples herein) may be replicated for each of the multiple lanes supported by the retimer 910 (and at each side of the retimer (e.g., with separate elasticity buffers for each lane at each of its two receivers (e.g., an upstream receiver port and downstream receiver port).

In one example, retimer logic 920 of the retimer 910 may facilitate the standard retimer functionality of the retimer 910, including the receiving of data at one of the retimer's receiver (Rx) ports and regenerating the data for transmission on a corresponding one of the retimer's transmitter (Tx) ports. The retimer 910 may additionally possess protocol logic 925 to enable the retimer 910 to support and in some cases participate in link training, adaptation, and/or other functionality defined for one or more interconnect protocols. The protocol logic 925 may incorporate less than the entirety of a full protocol stack and may, instead, be a minimized set of functionality that allows the retimer 910 to be inserted in a link without disrupting the normal initialization and operation of a link as defined in an interconnect protocol. In some instances, the protocol logic 925 may be limited to supporting a single interconnect protocol (giving the retimer 910 a protocol-specific design). In other cases, the protocol logic 925 may be provided with protocol logic for multiple different interconnect protocol, and a bit (or bits) may be set (e.g., in a register corresponding to the retimer 910) to indicate what subset of the protocol logic 925 is to be enabled on a particular link (e.g., such that only a single one of the protocols' logic is enabled), among other examples.

Protocol logic 925 may be provided on a retimer 910 to enhance the base retimer logic 920 and allow the retimer 910 to support activities of a link compliant with a particular interconnect specification (e.g., PCIe, USB, SATA, UPI, etc.). For instance, a retimer may include logic to support or be aware of such activities as electrical idle exit/entry, speed changes, link width negotiation and changes, equalization, among other features defined in a corresponding interconnect specification. For instance, in PCIe, data rate (or "speed") changes may be requested by one of the devices connected on the PCIe link. For instance, a downstream port of a device may request speed change through Equalization (EQ) Training Sequence 1 (TS1) Ordered Sets (OSes) to inform the upstream port of the other device. For instance, a defined sequence of ordered sets may be sent each with one or more bits (e.g., a speed change bit in a PCIe TS1 or TS2 ordered set) set to indicate a speed change. The receiving device may respond to confirm or deny the request to change speed by sending a corresponding sequence of ordered sets to the requesting device. If the request is acknowledged, the link can be retrained (using further sequences of ordered sequences) to operate at the new speed. Similarly, patterns of ordered sets (e.g., TS1s and/or TS2s) may be sent according to specification-defined parameters and/or with particular OS bits encoded to indicate a link width to be applied within the link, a request (and subsequent acknowledgement) to change the link width, a change to a clock modulation mode (e.g., enabling or disabling spread spectrum modulation), among other examples. Further, rather than equipping a retimer with a full protocol stack or protocol layer, implementations of an enhanced retimer may be equipped with only particular portions of protocol specific logic required to handle (at the retimer) certain features such as dynamic speed change, transmitter equalization, electrical idle entry for power state changes, clock modulation changes, link width changes, and receiver detection (e.g., for hot plug), among potentially other additional or alternative examples.

An elasticity buffer 930 of a retimer may be provided to compensate for differences in frequencies between bit rates at the two ends (e.g., 905, 915) of a link. The elasticity buffer 930 may be scaled so as to be capable of holding enough symbols to handle worst case differences in frequency and worst case intervals between symbols that can be used for rate compensation (e.g., SKP OSes). In this implementation, the depth of the elasticity buffer may be dynamically resized, although the maximum size of the elasticity buffer may be according to a worst case identified for a particular protocol supported by the retimer 910. Logic (e.g., physical layer logic of the retimer controlling the elasticity buffer 930) may be responsible for inserting or removing symbols from specialized data sequences (e.g., SKP OS, ALIGNs, other OSes, etc.) designated or designed for being increased or reduced at the buffer 930 in order to avoid overflow or underflow of the elasticity buffer. For instance, protocol logic 925 may include logic (e.g., logical PHY logic) to monitor received data streams and determine when these specialized data sequences are received, providing an opportunity for the elasticity buffer to add or remove symbols to attempt to keep the capacity of the buffer 930 at a particular level (e.g., as close to half full as possible). However, this target capacity can correspond to the average latency that will be introduced due to the retimer elasticity buffer 930. Accordingly, it may be desirable to minimize the (active) size of the elasticity buffer so as to reduce latency on the link while still managing frequency mismatches and protecting against buffer over/underflow.

Size of the elasticity buffer 930 may be managed by a buffer manager 935 component of the retimer 910 so as to dynamically and autonomously manage the latency introduced by the elasticity buffer 930. In one example, the buffer manager 935 may include link change detection logic 940, change mapping logic 945, and buffer size change logic 950, among other modules and sub-components (e.g., implemented in hardware circuitry, hardware logic, firmware, and/or software). In one example, link change detection 940 logic may be equipped with functionality to identify various types of changes to characteristics of a link on which the retimer 910 is implemented. Such characteristics may include those characteristics which may impact the maximum size needed for the elasticity buffer 930 in order to avoid over- or underflow, such as the link width of the link, whether (and what type) of clocking modulation is applied at clocks of the link endpoints (e.g., 905, 910), the interval at which specialized data sequences (e.g., SKP OSes) are sent on the link (providing opportunities to compensate for capacity in the elasticity buffer 930 when it approaches an underflow (by adding bits or symbols to the received specialized data sequence) or overflow condition (by removing bits or symbols from the received specialized data sequence)), the speed of the link, the payload or packet size (e.g., as the specialized data sequences may only be allowed to be sent between packets), among other examples.

The link change detection logic 940, in some cases, may interoperate with or be combined with protocol logic 925, and recognize requests, sequences, and other information in data streams sent over the retimer by the endpoints 905, 915 to not only detect that a change to one of these link characteristics is taking or is about to take place, but to also detect the nature or degree of the change (e.g., the amount of lanes being added in a link width change, the type of clock modulation being applied, the amount of the speed change, the amount of a payload size change). The messaging of such changes may be protocol-defined and protocol logic 925 may enable the detection and proper interpretation of such messaging/signaling between devices 905, 915. The buffer manager 910 may additionally be equipped with logic 945 to map a type (and degree) of link change to a corresponding change in size of the elasticity buffer. For instance, changing link width may effect an inversely proportional change in the size of the elasticity buffer. As an example, upconfiguring the link width of the link from a x4 (i.e., 4 lane) link to a x16 (i.e., 16 lane) link, may allow the size of the elasticity buffer 930 to be reduced by 75%. Additionally, disabling a particular clock modulation scheme (e.g., SRIS) may be mapped (by change mapping module 945) to a particular reduction in the elasticity buffer (e.g., due to the expected reduction in ppm by removing the particular clock modulation), as well as changes (increases or decreases) in the maximum payload size adopted on the link (which may be mapped by the change mapping module 945 to corresponding increases or decreases that may be made to the depth of the elasticity buffer 930). In essence, the change mapping module 945 may quantify the amount by which the size of the elasticity buffer 930 may be increased or decreased in response to detecting a particular type (and degree) of change to the characteristics of the link. The buffer change module 950 may utilize this information to cause the size of the elasticity buffer 930 to be changed by the amount determined using the link change detection 940 and change mapping module 945.

In some implementations, changes to the size of the elasticity buffer 930 (by buffer manager logic 935) may be limited to certain states or operational modes of the link. In one example, changing the size of the retimer's elasticity buffer 930 may potentially cause data sent to the retimer 910 for retiming to be lost, changed, or corrupted. This may be unacceptable in operational transmitting states, where critical application or system management data is sent between the devices over the retimer 910 (e.g., in a link state (e.g., L0) intolerant to this degree of potential bit or packet loss). Accordingly, in one example, changes to the size of the elasticity buffer 930 may be limited to link training states tolerant to the dropping of symbols that may be required when resizing the elasticity buffer.

In one example, the retimer monitors training sets sent on the link (and over the retimer) to recognize when a change to attributes of the link is to occur, such as a dynamical link width change. The enhanced retimer may then adjust the elasticity buffer size dynamically by dropping or adding training sets at a certain point in the (re)training. In one implementation, link training may involve a two-step process with the first step dedicated to establishing bit-lock, symbol/block alignment, setting up sequence scrambling logic (e.g., linear feedback shift registers (LFSRs)), and otherwise bringing the link to an operational state. For example, training in PCIe may involve one endpoint device sending particular (e.g., TS1) ordered sets and may switch to TS2 ordered sets (e.g., to indicate a transition to the second training step) when it has accomplished the first step. Further, in some implementations, the link may be tolerant to any additions/deletions of (TS1) ordered sets in training stages that bring the link to an operational state. However, once the link is brought to this point, the link may be much more sensitive (and even forbid) the adding or deletion of data. For instance, in PCIe, once a device begins sending TS2 ordered sets, the link does not possess feature to deal with arbitrary errors in the TS2 ordered sets in both directions. As a result, in one example, the changes to a retimer buffer size may be made during training stages that take place prior to the link's operational state (e.g., during the TS1 stage of link training). In some instances, the retimer may even act to extend this training stage in order to take advantage of this window and "buy time" to properly set the depth of its elasticity buffer based on characteristics of the link. For instance, the retimer may artificially continue to send TS1s in both upstream and downstream directions to extend the TS1 training stage and permit its link partners (e.g., 905, 915) to handle any symbol losses/additions that occur with the change in elasticity buffer.

In some implementations, a link training phase in which retimer elasticity buffer size changes may be permitted, may also conveniently be a link training phase in which one or more of the corresponding link characteristic changes would be detected that serve as the basis of the elasticity buffer resizing. For instance, in PCIe, link width changes and changes to SRIS modes may take place through messaging during a link training phase in which TS1 OSes are sent and elasticity buffer resizing may be performed. In other instances, some types of link characteristic changes may take place outside of these allowed states. For instance, a change in max payload size may be initiated by devices (e.g., 905 and 915) outside of a link training phase or other link state where retimer elasticity buffer resizing is allowed (due to the potential for dropped or added symbols during the resizing). Accordingly, in one example, a buffer manager 935, upon identifying some types of link characteristic changes (e.g., using link change detection module 940) and identifying that this change takes place outside of an operational condition of the link allowing for resizing of the elasticity buffer 930, may attempt to force the link into a link training phase or other state in which the resizing is possible (e.g., a recovery or configuration state), in response to such link characteristics changes. For instance, in an example of a PCIe compliant link and retimer, the buffer manager 935, in response to detecting an attempt to change the max payload size supported on the link, may force an entry to a PCIe Recovery phase by using mechanisms such as flipping the sync header in the 128b/130b encoding or sending TS1s in the 8b/10b encoding, among other techniques to force the link into recovery and provide an opportunity for the buffer manager 935 to adjust the size of the elasticity buffer based on the max payload size change, among other examples.

In some implementations, some link characteristic changes may not be able to be detected (e.g., through protocol logic 925) from conventional in-band data streams of the protocol. This may be due to the minimized or otherwise simplified protocol stack logic resident on the retimer (e.g., and used by components such as link change detection module 940). In some cases, to support the detection of some types of link characteristic changes and thereby promote corresponding retimer elasticity buffer size adjustments, specialized messaging packets may be defined through which one or both of the endpoints (e.g., 905, 915) may inform the retimer 910 of an upcoming or pending change to a relevant link characteristics (e.g., SRIS mode or max payload size, etc.). In other examples, one or more sideband ports may be defined on the retimer 910 to support sideband channels (e.g., 955) with one or both of its link partners (e.g., 905, 915), over which out-of-band hints, signals, and messages may be sent from one of the devices (e.g., 905) to the retimer 910 and communicate an upcoming or pending change to a link characteristic potentially affecting the retimer's elasticity buffer 930 size. In one particular example based on a PCIe-compliant system, a host controller (e.g., on device 905) may inform the retimer 910 of the max payload size (or change to the max payload size) and/or whether SRIS is enabled on the link partner clocks through a sideband mechanism (e.g., System Management Bus (SM-BUS), Joint Test Action Group (JTAG), etc.) or an alternate in-band mechanism (e.g., by providing a vendor defined management command in the last three symbols of an enhanced SKP OS), among other example implementations.

In one example implementation, the enhanced features described above may be provided in connection with Physical Interface for PCI Express (PIPE) logic implemented on the retimer. PIPE may provide a standard interface between a MAC/Controller and PHY of an interconnect. In one example of a PIPE-based implementation, the PIPE MAC/controller may be enhanced with logic to update the signals for the elasticity buffer size when the controller identifies that it is safe for the dynamic elasticity buffer size adjustment to occur (e.g., because the link traffic is sending and receiving TS1 ordered sets) based on a detected event such as link width change, speed change, ppm difference change (e.g., from a change in the clock architecture), or change in the max payload size. The PHY makes the update to the elasticity buffer and signals when the update is complete. In one example, the signals in the PIPE interface to indicate the size change and when it is completed may be a register that is updated or a set of signals that indicates the size. Further, the status signal used by the PHY to indicate completion could be a signal/wire or a register that is updated by the PHY. The PHY may be enhanced to implement dynamic elasticity buffer changes quickly and without causing any data corruption (only loss or duplicate date insertion). For example, the PHY (or other buffer change logic (e.g., 930)) may implement a reduction in size of the elasticity buffer by reducing the distance between its read and write buffer pointer and silently dropping data between the old and new read pointer locations, among other potential implementations. To increase the size of the elasticity buffer the PHY (or other buffer change logic (e.g., 930)), in one example, may increase the distance between the read and write pointer and add duplicate entries to fill the increased buffer range between the new read and write pointers, among other example implementations.

Continuing with the example of a PIPE-based implementation, a MAC in the retimer 910 may be responsible for changing the elasticity buffer depth when the conditions are right (e.g., change in max payload size, link width, ppm difference, speed change) while TS1's are still exchanged. Even if it receives TS2's in the receivers on its upstream ports (connected to either sublink of the retimer 910), the MAC may cause valid TS1s to instead be generated and sent out on the retimer transmitters. The MAC (or other example logic) may continue to ensure that TS1s are received by its downstream link partners to preserve the opportunity for the dynamic retimer elasticity buffer resizing to be completed. The MAC may ensure that this is so until it determines that the elasticity buffer depths have been successfully updated and confirms that the packets are being received at the output of both elasticity buffers (corresponding to each of its receivers). In one example, the MAC may continue sending TS1s until one or more EIEOSs (Electrical Idle Exit Ordered Sets) (e.g., in PCIe) have been sent to ensure block alignment is restored before moving to TS2s after the elasticity buffer depth change. When the MAC switches over to taking control of sending TS1s from the elasticity buffer, it can ensure the same block boundary is maintained. However, when it has to switch back to resuming sending the contents of the elasticity buffer, that boundary may or may not be preserved. The MAC may ensure that it continues sending TS1s with the new block boundary alignment (even if it is receiving TS2s) and may continue doing so until it passes along at least one EIEOS. This ensures that the link partners (e.g., 905, 915) can obtain their block alignment again and continue with link training.

As noted above, in some implementations, events suggesting an elasticity buffer resizing may take place during the same link training phases that allow such elasticity buffer resizing to take place. If the link is in an operational or active state (e.g., L0 state) when a relevant link characteristics is determined to be changing (or have changed), the MAC may be responsible for forcing the link to a recovery state in response. This may operate to ensure that, by the time its link partners (e.g., 905, 915) see the TS2s, the elasticity buffer depth has been successfully changed to reflect the lowest latency needed to operate the link reliably.

Figure 10:
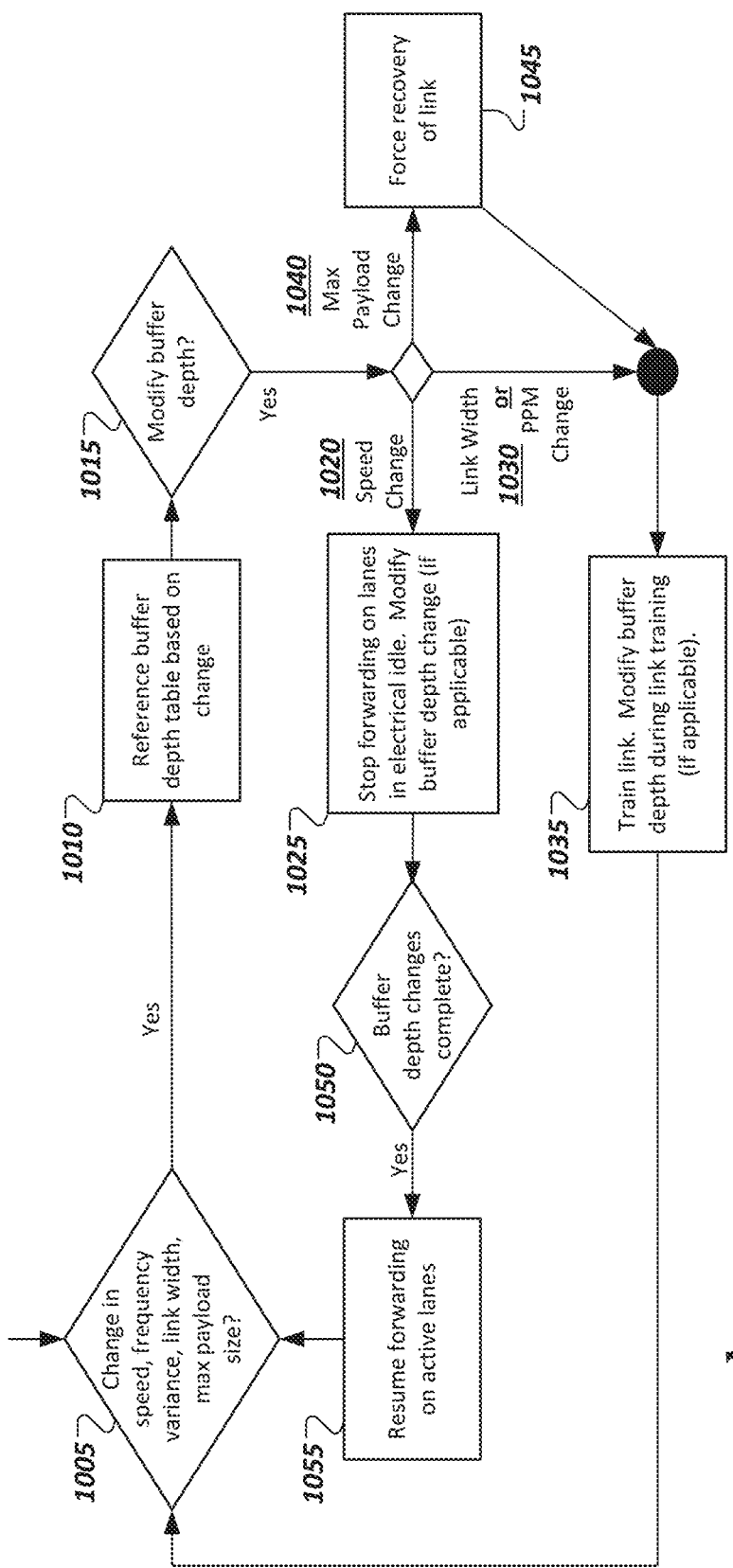
FIG. 10 is a flowchart illustrating example techniques for dynamically resizing an elasticity buffer of a retimer.

Turning to FIG. 10, a flow diagram 1000 is presented illustrating example techniques for dynamically resizing the elasticity buffer of an enhanced retimer on a link. Logic may be provided on the enhanced retimer to determine (at 1005) whether changes in characteristics of the link have been detected, including such examples as link speed, frequency variance (e.g., ppm from changes to the clocking architecture and/or mode), link width, and max payload size. When a link characteristic change is detected that may impact an optimal elasticity buffer size (or "depth"), the retimer may reference a buffer depth table defining mappings between the type and degree of the detected characteristic change, and the potential effect such a change can have on the maximum elasticity buffer size that needs to be supported by the retimer. In some cases, the change may suggest that no change is necessary. In other cases, referencing 1010 the buffer depth table at the retimer may cause the retimer logic to determine (at 1015) that the present elasticity buffer depth should be modified in accordance with the mapping of the buffer depth table.

The manner in which the retimer approaches the modification of its elasticity buffer depth may be based on the type of the link characteristic change. For instance, for a link speed change (at 1020), the retimer may stop forwarding on lanes in electrical idle and perform the buffer depth resizing (at 1025). Upon determining (at 1050) that any buffer depth changes have been successfully completed, the retimer may then resume 1055 forwarding of data on the link on the active lanes (which, in the case of a link width change, may include fewer or more lanes than before the buffer depth change) and monitor the link for any other changes. For a link width change (or other change that is detected during link training (such as a ppm change) (at 1030), the buffer depth may be resized 1035 (in accordance with the findings in 1010) during a phase of link training capable of handling symbols being dropped or added by the retimer in connection with the buffer resizing. The degree to which the buffer is resized may be dependent on the degree to which the link width is changed (e.g., a link width change from x4 to x8 may cause the elasticity buffer size to be reduced in half, while a link width change from x16 to x4 may cause the elasticity buffer size to be quadrupled, among other examples), the amount of ppm that is added or reduced in a link characteristic change, etc.

In some cases, the detection of a link characteristic change (at 1005) may occur while the link is in an active state (e.g., L0) or in a training phase that is sensitive to symbol loss (or addition) potentially introduced during an elasticity buffer resizing. For instance, for a change to a max payload size detected (at 1005) at the retimer (e.g., via sideband messaging) during L0, the retimer may first force 1045 the link into a recovery state change (e.g., by deliberately introducing errors into data it retimes and forwards downstream) to bring the link into a training phase that allows resizing of the retimer's elasticity buffer. At this point, the retimer may appropriately modify 1035 the buffer depth (e.g., commensurate with the added or reduced length of the payload size) during the link training resulting from the forced link recovery (at 1045). The retimer can then monitor (at 1005) the link (e.g., during training or active states) for any further link characteristic changes, among other examples.

Figure 11A:
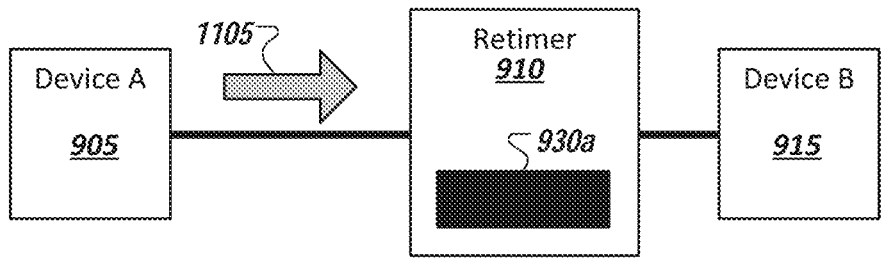
FIGS. 11A-11E illustrate simplified block diagrams illustrating the resizing of an elasticity buffer of a retimer in one example.

FIGS. 11A-11E illustrate a series of simplified block diagrams 1100a-e illustrating an example of dynamic resizing of the depth of an example elasticity buffer of an example retimer 910. In each of the illustrations of block diagrams 1100a-e, an example retimer 910 is shown in use to extend a link connection between two computing devices (e.g., 905, 915). A retimer elasticity buffer (e.g., 930a-e) is shown to illustrate the dynamic adjustments in size it may undergo as various changes to link characteristics are detected by the enhanced retimer 910. For instance, in the example of FIG. 11A, a retimer 910 is shown with its elasticity buffer 930a sized according to a worst case combination of link characteristics. In the representations of FIGS. 11A-11E, the darkened portion of the retimer elasticity buffer represents the "active" portion of the elasticity buffer, or the portion configured for use in buffering data. As the retimer is resized, unused portions of the buffer may result represented in FIGS. 11A-11E as the lightened portion of the elasticity buffer. Accordingly, in FIG. 11A, a retimer 910 may initially set the size of its elasticity buffer 930a to a default size, such as its maximum size (as illustrated by the fully-blackened retimer 930a). The maximum size of an elasticity buffer may correspond to the size needed to handle a worst case scenario relating to ppm mismatch, SKP interval, link speed, link width, maximum packet payload size, etc. possible on the link. The elasticity buffer may be designed to keep capacity as near to half-full as possible, by adding or subtracting symbols from SKP OSes received at the retimer 910 and buffered in the elasticity buffer. In the example of FIG. 11A, the retimer 910 may be configured to keep the elasticity buffer filled with half of its maximum capacity. This initial or default size may be in accordance with an initial boot or startup of a system or link of the system, among other examples.

Continuing with the example of FIG. 11A, a stream of data 1105 may be generated and sent by Device A (905) to Device B (915), with the retimer 910 responsible for retiming (or regenerating and forwarding) the data to extend the link. Device B may likewise generate data that is to be sent over retimer 915 and forwarded on to Device A. In this particular example, retimer 910 may receive data 1105 (and buffer the data in elasticity buffer 930a), and may inspect the data (e.g., using protocol-aware logic) in an attempt to detect changes to various characteristics of the link, upon which the size of the elasticity buffer may ultimately be based, such as ppm changes, link width changes, changes to the maximum packet or payload size, etc. In this example, the retimer 910 may determine such a change, such as a link width increase (where idle available lanes are activated and used in transmission of data on the link). For instance, in PCIe, supported link widths may include x1, x2, x4, x8, x16, and x32, and changes may occur (e.g., at the request of Device A in this example) during the life of the link. As reflected in FIG. 11B, in response to detecting the link width increase (from data 1105), the retimer 910 may dynamically change the active size of the elasticity buffer, in this case reducing the size of the elasticity buffer (as shown at 930b) an order of magnitude corresponding to the order of magnitude of the increase in the link width.

Figure 11B:
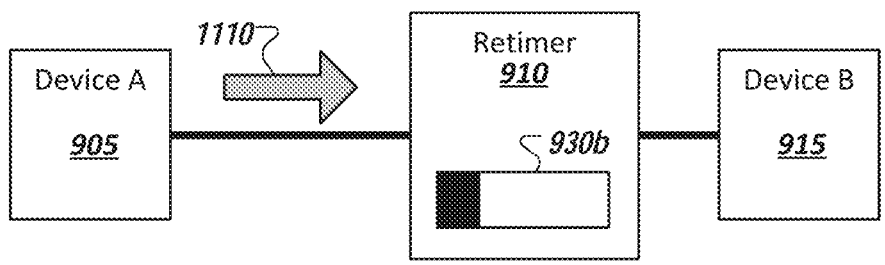
Figure 11C:
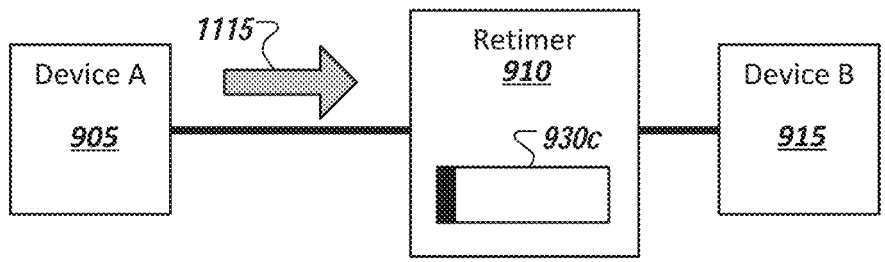
Figure 11D:
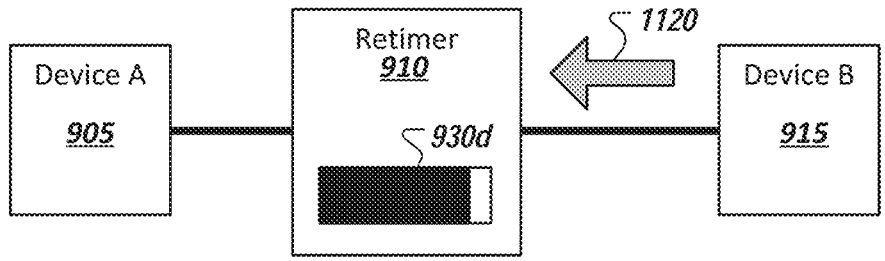
Figure 11E:
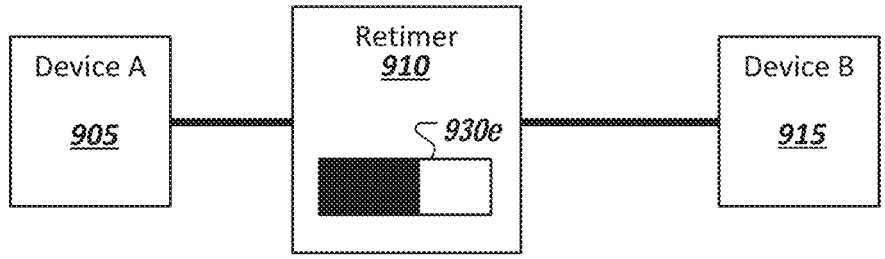

Continuing with the example above, additional data 1110 may be received following the change to the elasticity buffer size (i.e., between FIGS. 11A and 11B) and the retimer 910 can identify yet another change to a characteristic of the link. In the example of FIG. 11B, a change to the SRIS mode applied at the respective clocks of Devices A and B may be detected in the data 1110 by the retimer 910, in this case the disabling of the SRIS modulation. As reflected in the updated elasticity buffer representation 930c shown in FIG. 11C, the retimer 910 may again dynamically resize its elasticity buffer to account for the detected change to the link characteristic (in this case reducing the size of the elasticity buffer further to reflect a reduction in the ppm resulting from the devices' (e.g., 905, 915) clock architectures.

While the examples above discuss changes to link characteristics which may be detected by an enhanced retimer to cause decreases in the retimer's elasticity buffer size, other link characteristic modifications may cause increases in the elasticity buffer size. For instance, upon reducing the elasticity buffer size in FIG. 11C based on data 1110, the link and retimer may resume operation, when yet another stream of data (e.g., 1115) is sent that identifies still another modification to a (a different or same) link characteristic. The retimer 910 may likewise detect and properly interpret data (e.g., TSes or other ordered sets) included in the data stream 1115 to determine this link characteristic change and further determine that this change (e.g., a reduction in the link width, re-enablement of the SRIS modulation feature, an increase in maximum payload size, etc.) correlates to an increase in the elasticity buffer's size (as reflected by the updated elasticity buffer 930d in FIG. 11D). Further, while the example of FIGS. 11A-11C may be interpreted to suggest that Device A is the initiator of the link characteristic modifications represented by data 1105, 1110, 1115, the retimer's 910 other link partner, Device B, may be equally capable of initiating or signaling a change to one or more link characteristics. For instance, data 1120 may be parsed by the retimer 910 to detect another link characteristic change and again reduce the size of its elasticity buffer in response (as reflected at the representation of the elasticity buffer 930e in FIG. 11E).

In some cases, such as during link training, data streams sent over a retimer 910 may indicate multiple relevant link characteristic modifications. Further, detecting a particular link characteristic modification may be based not simply on a data stream from one of the retimer's link partners (e.g., Device A), but may (based on a protocol definition) be based on data streams received from both link partners (e.g., Devices A and B), such as through the detection of a handshake indicating both a request and an acknowledgement of a proposed link characteristic modification, among other examples. In this sense, logic of the retimer, while implemented at least in part on a per-lane basis, may be coupled to coalesce data detected at both its downstream and upstream receiver ports and make elasticity buffer resizing decisions based on these findings. Additionally, while some link characteristic modifications may be detectable directly from in-band data streams, out-of-band messaging may also be utilized to communicate or indicate a link characteristic change (e.g., a change to max payload size) to the retimer 910, allowing the retimer to resize its elasticity buffer accordingly, among other examples.

Figure 12:
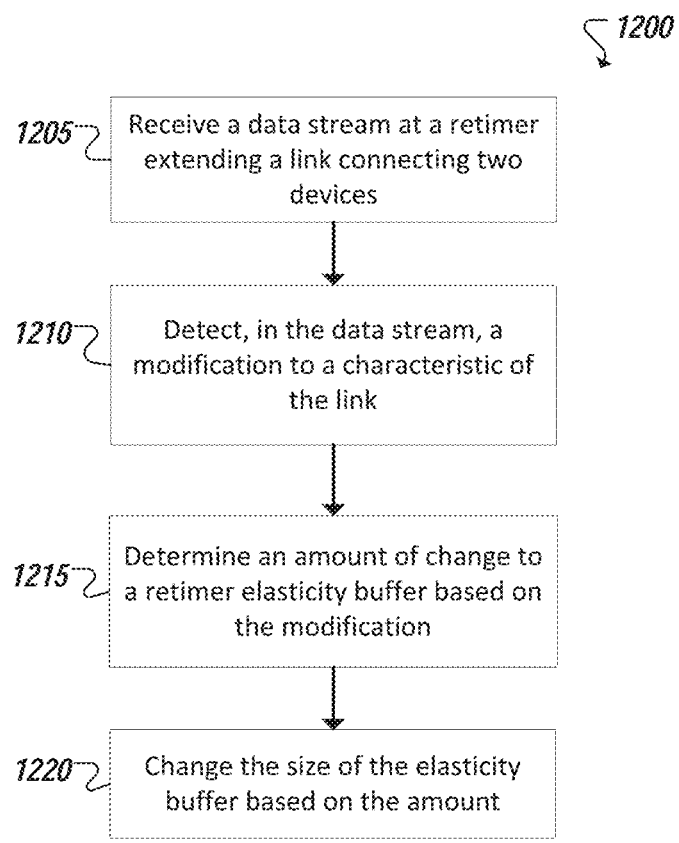
FIG. 12 is a flowchart illustrating example techniques in connection with a link including a retimer.

FIG. 12 is a flowchart 1200 illustrating an example technique involving a retimer configured to dynamically adjust the size of its elasticity buffer based on modifications to characteristics of a link extended using the retimer and connecting two devices. A data stream may be received 1205 by the retimer, as generated by one of the two devices. In some cases, the data stream may include data sent from one of the two devices to the other (e.g. in a downstream direction), as well as the data sent in response (e.g., in the upstream direction). The retimer may scan data that it receives and is to regenerate for forwarding on to the link to detect 1210 (e.g., from ordered sets, training sequences, handshakes, encodings, or other signaling in the data stream) a modification to one or more of a set of characteristics of the link. The set of characteristics of interest may include those that serve as the basis for a worst case sizing of the retimer's elasticity buffer. Detection of a change (or specification of the actual value or state) of one of these link characteristics may be processed by the retimer to determine a resizing of the elasticity buffer in order to reduce latency introduced by the elasticity buffer on the link. For instance, the retimer may determine a type and scope of the link characteristic modification and consult a table or other mapping to calculate, identify, or otherwise determine 1215 an amount by which the elasticity buffer size could be modified (i.e., increased or decreased) based on the link characteristic modification. Further, in response to detecting 1210 the link characteristic modification, the retimer may automatically and dynamically change 1220 the size of its elasticity buffer by the amount determined 1215 to more accurately reflect the updated "worst case" based on the link characteristic modification, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 13:
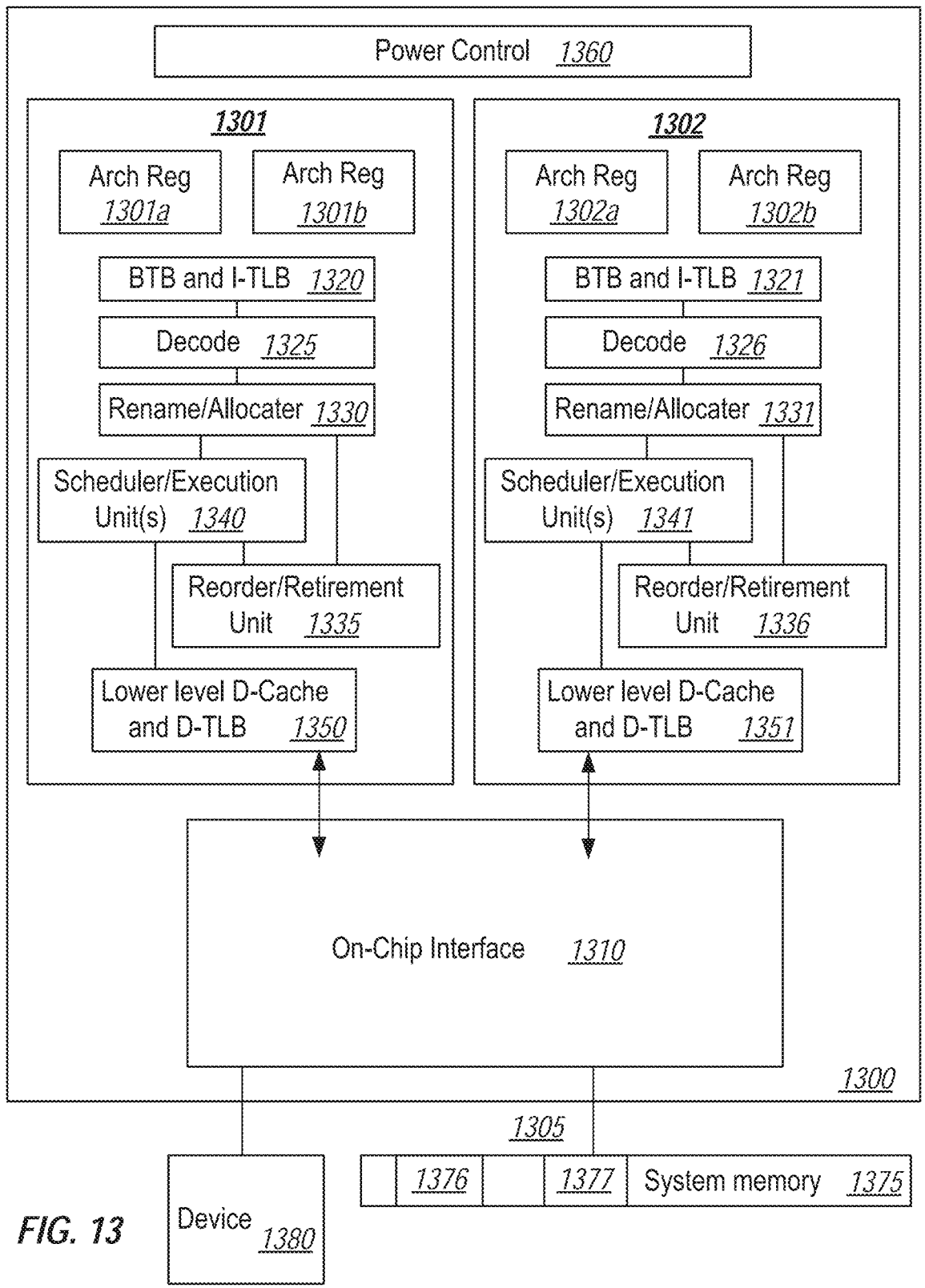
FIG. 13 illustrates an embodiment of a block diagram for a computing system including a multicore processor.

Referring to FIG. 13, an embodiment of a block diagram for a computing system including a multicore processor is depicted. Processor 1300 includes any processor or processing device, such as a microprocessor, an embedded processor, a digital signal processor (DSP), a network processor, a handheld processor, an application processor, a co-processor, a system on a chip (SOC), or other device to execute code. Processor 1300, in one embodiment, includes at least two cores—core 1301 and 1302, which may include asymmetric cores or symmetric cores (the illustrated embodiment). However, processor 1300 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1300, as illustrated in FIG. 13, includes two cores—core 1301 and 1302. Here, core 1301 and 1302 are considered symmetric cores, i.e. cores with the same configurations, functional units, and/or logic. In another embodiment, core 1301 includes an out-of-order processor core, while core 1302 includes an in-order processor core. However, cores 1301 and 1302 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1301 are described in further detail below, as the units in core 1302 operate in a similar manner in the depicted embodiment.

As depicted, core 1301 includes two hardware threads 1301a and 1301b, which may also be referred to as hardware thread slots 1301a and 1301b. Therefore, software entities, such as an operating system, in one embodiment potentially view processor 1300 as four separate processors, i.e., four logical processors or processing elements capable of executing four software threads concurrently. As alluded to above, a first thread is associated with architecture state registers 1301*a*, a second thread is associated with architecture state registers 1301*b*, a third thread may be associated with architecture state registers 1302*a*, and a fourth thread may be associated with architecture state registers 1302*b*. Here, each of the architecture state registers (1301*a*, 1301*b*, 1302*a*, and 1302*b*) may be referred to as processing elements, thread slots, or thread units, as described above. As illustrated, architecture state registers 1301*a* are replicated in architecture state registers 1301*b*, so individual architecture states/contexts are capable of being stored for logical processor 1301*a* and logical processor 1301*b*. In core 1301, other smaller resources, such as instruction pointers and renaming logic in allocator and renamer block 1330 may also be replicated for threads 1301*a* and 1301*b*. Some resources, such as re-order buffers in reorder/retirement unit 1335, ILTB 1320, load/store buffers, and queues may be shared through partitioning. Other resources, such as general purpose internal registers, page-table base register(s), low-level data-cache and data-TLB 1315, execution unit(s) 1340, and portions of out-of-order unit 1335 are potentially fully shared.

Processor 1300 often includes other resources, which may be fully shared, shared through partitioning, or dedicated by/to processing elements. In FIG. 13, an embodiment of a purely exemplary processor with illustrative logical units/resources of a processor is illustrated. Note that a processor may include, or omit, any of these functional units, as well as include any other known functional units, logic, or firmware not depicted. As illustrated, core 1301 includes a simplified, representative out-of-order (OOO) processor core. But an in-order processor may be utilized in different embodiments. The OOO core includes a branch target buffer 1320 to predict branches to be executed/taken and an instruction-translation buffer (I-TLB) 1320 to store address translation entries for instructions.

Core 1301 further includes decode module 1325 coupled to fetch unit 1320 to decode fetched elements. Fetch logic, in one embodiment, includes individual sequencers associated with thread slots 1301*a*, 1301*b*, respectively. Usually core 1301 is associated with a first ISA, which defines/specifies instructions executable on processor 1300. Often machine code instructions that are part of the first ISA include a portion of the instruction (referred to as an opcode), which references/specifies an instruction or operation to be performed. Decode logic 1325 includes circuitry that recognizes these instructions from their opcodes and passes the decoded instructions on in the pipeline for processing as defined by the first ISA. For example, as discussed in more detail below decoders 1325, in one embodiment, include logic designed or adapted to recognize specific instructions, such as transactional instruction. As a result of the recognition by decoders 1325, the architecture or core 1301 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1326, in one embodiment, recognize the same ISA (or a subset thereof). Alternatively, in a heterogeneous core environment, decoders 1326 recognize a second ISA (either a subset of the first ISA or a distinct ISA).

In one example, allocator and renamer block 1330 includes an allocator to reserve resources, such as register files to store instruction processing results. However, threads 1301*a* and 1301*b* are potentially capable of out-of-order execution, where allocator and renamer block 1330 also reserves other resources, such as reorder buffers to track instruction results. Unit 1330 may also include a register renamer to rename program/instruction reference registers to other registers internal to processor 1300. Reorder/retirement unit 1335 includes components, such as the reorder buffers mentioned above, load buffers, and store buffers, to support out-of-order execution and later in-order retirement of instructions executed out-of-order.

Scheduler and execution unit(s) block 1340, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1350 are coupled to execution unit(s) 1340. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1301 and 1302 share access to higher-level or further-out cache, such as a second level cache associated with on-chip interface 1310. Note that higher-level or further-out refers to cache levels increasing or getting further way from the execution unit(s). In one embodiment, higher-level cache is a last-level data cache—last cache in the memory hierarchy on processor 1300—such as a second or third level data cache. However, higher level cache is not so limited, as it may be associated with or include an instruction cache. A trace cache—a type of instruction cache—instead may be coupled after decoder 1325 to store recently decoded traces. Here, an instruction potentially refers to a macro-instruction (i.e. a general instruction recognized by the decoders), which may decode into a number of micro-instructions (micro-operations).

In the depicted configuration, processor 1300 also includes on-chip interface module 1310. Historically, a memory controller, which is described in more detail below, has been included in a computing system external to processor 1300. In this scenario, on-chip interface 1310 is to communicate with devices external to processor 1300, such as system memory 1375, a chipset (often including a memory controller hub to connect to memory 1375 and an I/O controller hub to connect peripheral devices), a memory controller hub, a northbridge, or other integrated circuit. And in this scenario, bus 1305 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1375 may be dedicated to processor 1300 or shared with other devices in a system. Common examples of types of memory 1375 include DRAM, SRAM, non-volatile memory (NV memory), and other known storage devices. Note that device 1380 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1300. For example in one embodiment, a memory controller hub is on the same package and/or die with processor 1300. Here, a portion of the core (an on-core portion) 1310 includes one or more controller(s) for interfacing with other devices such as memory 1375 or a graphics device 1380. The configuration including an interconnect and controllers for interfacing with such devices is often referred to as an on-core (or un-core configuration). As an example, on-chip interface 1310 includes a ring interconnect for on-chip communication and a high-speed serial point-to-point link 1305 for off-chip communication. Yet, in the SOC environment, even more devices, such as the network interface, co-processors, memory 1375, graphics processor 1380, and any other known computer devices/interface may be integrated on a single die or integrated circuit to provide small form factor with high functionality and low power consumption.

In one embodiment, processor 1300 is capable of executing a compiler, optimization, and/or translator code 1377 to compile, translate, and/or optimize application code 1376 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 14:
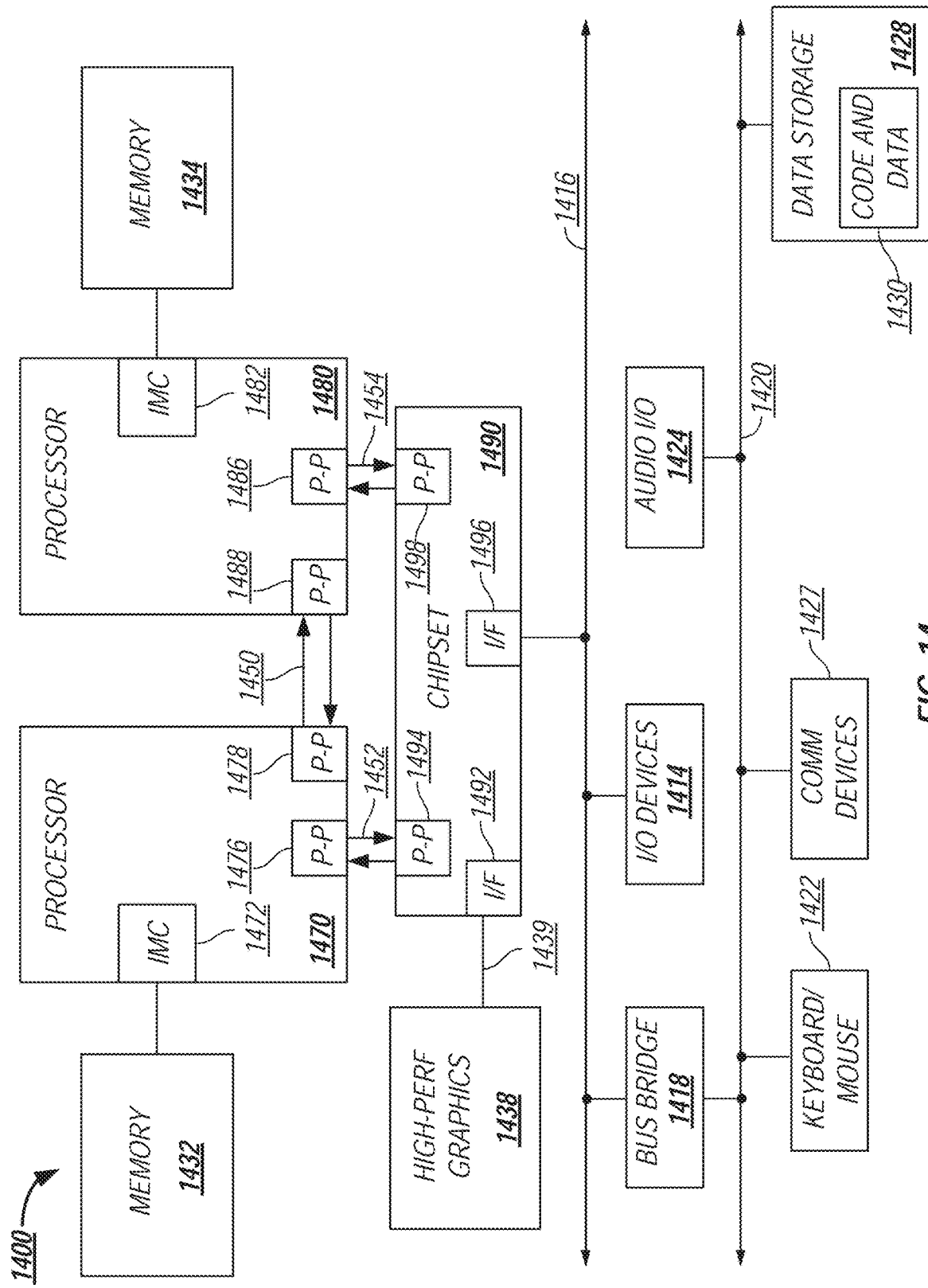
FIG. 14 illustrates an embodiment of a block for a computing system including multiple processors.

Referring now to FIG. 14, shown is a block diagram of a second system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as a high-performance architecture. As a result, the invention may be implemented within the QPI architecture.

While shown with only two processors 1470, 1480, it is to be understood that the scope of the present invention is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is an apparatus including a retimer including an elasticity buffer, buffer logic, a receiver, and a controller. The buffer logic may add or subtract data in the elasticity buffer to compensate for different bit rates of two devices to be connected over a link, where the retimer is to be positioned between the two devices on the link. The receiver may receive a data stream to be sent between the two devices on the link. The controller may determine, from the data stream, a modification to one or more characteristics of the link, and cause size of the elasticity buffer to be changed from a first size to a second size based on the modification.

Example 2 may include the subject matter of example 1, where the one or more characteristics includes link width of the link.

Example 3 may include the subject matter of example 2, where the size of the elasticity buffer is to be decreased in response to an increase in the link width and decreased in response to a decrease in the link width.

Example 4 may include the subject matter of any one of examples 1-3, where the modification includes a change to a clocking mode applied at clocks of the two devices.

Example 5 may include the subject matter of example 4, where the change to the clocking mode includes enabling or disabling spread spectrum modulation at the clocks.

Example 6 may include the subject matter of any one of examples 1-5, where the controller is further to determine a second modification to another characteristic of the link based on a sideband message sent from one of the two devices to the retimer; and cause another change to the size of the elasticity buffer based on the second modification.

Example 7 may include the subject matter of example 6, where the second modification includes a modification to a maximum packet size supported on the link.

Example 8 may include the subject matter of any one of examples 1-7, where the size of the elasticity buffer is to be changed in a link training phase of the link.

Example 9 may include the subject matter of example 8, where the data stream is received during the link training phase, the data stream includes one or more ordered sets, and the modification is determined from the one or more ordered sets.

Example 10 may include the subject matter of example 8, where the data stream is received during an active link state of the link and causing the size of the elasticity buffer to be changed from the first size to the second size includes forcing a reset of the link to cause the link training phase, and completing the change to the size of the elasticity buffer during the link training phase.

Example 11 may include the subject matter of example 10, where forcing the reset of the link includes changing particular data in the data stream received from a first one of the two devices to a particular value; and sending the changed particular data to the second one of the two devices, where the particular value artificially causes an error condition on the link.

Example 12 may include the subject matter of any one of examples 1-11, where the buffer logic is to add or subtract data from particular ordered sets sent recurrently in the data stream and buffered at the elasticity buffer.

Example 13 may include the subject matter of example 12, where the particular ordered sets are defined according to a particular protocol specification for use in compensating for different bit rates of devices on a link.

Example 14 may include the subject matter of example 13, where the particular ordered sets include SKP ordered sets.

Example 15 may include the subject matter of any one of examples 13-14, where the particular protocol specification includes a specification of one of a Universal Serial Bus (USB)-based protocol or a Peripheral Component Interconnect Express (PCIe)-based protocol.

Example 16 may include the subject matter of any one of examples 1-15, where the first size includes a size corresponding to a worst case elasticity buffer size for the link.

Example 17 is a method including: receiving a data stream at a retimer, where the data stream is to be sent between two devices connected on a link, the retimer is positioned between the two devices on the link, and the retimer includes an elasticity buffer to add or subtract data in the elasticity buffer to compensate for clock frequency variation between clocks of the two devices; detecting, in the data stream, an indication of a modification to one or more characteristics of the link; determining a particular amount of change to be made to size of the elasticity buffer based on the modification; and changing the size of the elasticity buffer by the particular amount.

Example 18 may include the subject matter of example 17, where the one or more characteristics includes link width of the link.

Example 19 may include the subject matter of example 18, where the size of the elasticity buffer is to be decreased in response to an increase in the link width and decreased in response to a decrease in the link width.

Example 20 may include the subject matter of any one of examples 17-19, where the modification includes a change to a clocking mode applied at clocks of the two devices.

Example 21 may include the subject matter of example 20, where the change to the clocking mode includes enabling or disabling spread spectrum modulation at the clocks.

Example 22 may include the subject matter of any one of examples 17-21, further including: determining a second modification to another characteristic of the link based on a sideband message sent from one of the two devices to the retimer; and causing another change to the size of the elasticity buffer based on the second modification.

Example 23 may include the subject matter of example 22, where the second modification includes a modification to a maximum packet size supported on the link.

Example 24 may include the subject matter of any one of examples 17-23, where the size of the elasticity buffer is to be changed in a link training phase of the link.

Example 25 may include the subject matter of example 24, where the data stream is received during the link training phase, the data stream includes one or more ordered sets, and the modification is determined from the one or more ordered sets.

Example 26 may include the subject matter of example 24, where the data stream is received during an active link state of the link and causing the size of the elasticity buffer to be changed from the first size to the second size includes: forcing a reset of the link to cause the link training phase; and completing the change to the size of the elasticity buffer during the link training phase.

Example 27 may include the subject matter of example 26, where forcing the reset of the link includes: changing particular data in the data stream received from a first one of the two devices to a particular value; and sending the changed particular data to the second one of the two devices, where the particular value artificially causes an error condition on the link.

Example 28 may include the subject matter of any one of examples 17-27, where the elasticity buffer is to add or subtract data from particular ordered sets sent recurrently in the data stream and buffered at the elasticity buffer.

Example 29 may include the subject matter of example 28, where the particular ordered sets are defined according to a particular protocol specification for use in compensating for different bit rates of devices on a link.

Example 30 may include the subject matter of example 29, where the particular ordered sets include SKP ordered sets.

Example 31 may include the subject matter of any one of examples 29-30, where the particular protocol specification includes a specification of one of a Universal Serial Bus (USB)-based protocol or a Peripheral Component Interconnect Express (PCIe)-based protocol.

Example 32 may include the subject matter of any one of examples 17-31, where the first size includes a size corresponding to a worst case elasticity buffer size for the link.

Example 33 is a system including means to perform the method of any one of examples 17-32.

Example 34 is a machine accessible storage medium having instructions stored thereon, where the instructions when executed on a machine, cause the machine to: detect, in a data stream received by a retimer, an indication of a modification to one or more characteristics of a link, where the data stream is to be sent between two devices connected on the link, the retimer is positioned between the two devices on the link, and the retimer includes an elasticity buffer to add or subtract data in the elasticity buffer to compensate for clock frequency variation between clocks of the two devices; determine a particular amount of change to be made to size of the elasticity buffer based on the modification; and cause a change to the size of the elasticity buffer by the particular amount.

Example 35 may include the subject matter of example 34, where the one or more characteristics includes link width of the link.

Example 36 may include the subject matter of example 35, where the size of the elasticity buffer is to be decreased in response to an increase in the link width and decreased in response to a decrease in the link width.

Example 37 may include the subject matter of any one of examples 34-36, where the modification includes a change to a clocking mode applied at clocks of the two devices.

Example 38 may include the subject matter of example 37, where the change to the clocking mode includes enabling or disabling spread spectrum modulation at the clocks.

Example 39 may include the subject matter of any one of examples 34-38, where the instructions, when executed, further cause the machine to determine a second modification to another characteristic of the link based on a sideband message sent from one of the two devices to the retimer, and cause another change to the size of the elasticity buffer based on the second modification.

Example 40 may include the subject matter of example 39, where the second modification includes a modification to a maximum packet size supported on the link.

Example 41 may include the subject matter of any one of examples 34-40, where the size of the elasticity buffer is to be changed in a link training phase of the link.

Example 42 may include the subject matter of example 41, where the data stream is received during the link training phase, the data stream includes one or more ordered sets, and the modification is determined from the one or more ordered sets.

Example 43 may include the subject matter of example 41, where the data stream is received during an active link state of the link and causing the size of the elasticity buffer to be changed from the first size to the second size includes forcing a reset of the link to cause the link training phase, and completing the change to the size of the elasticity buffer during the link training phase.

Example 44 may include the subject matter of example 43, where forcing the reset of the link includes changing particular data in the data stream received from a first one of the two devices to a particular value, and sending the changed particular data to the second one of the two devices, where the particular value artificially causes an error condition on the link.

Example 45 may include the subject matter of any one of examples 34-44, where the elasticity buffer is to add or subtract data from particular ordered sets sent recurrently in the data stream and buffered at the elasticity buffer.

Example 46 may include the subject matter of example 45, where the particular ordered sets are defined according to a particular protocol specification for use in compensating for different bit rates of devices on a link.

Example 47 may include the subject matter of example 46, where the particular ordered sets include SKP ordered sets.

Example 48 may include the subject matter of any one of examples 46-47, where the particular protocol specification includes a specification of one of a Universal Serial Bus (USB)-based protocol or a Peripheral Component Interconnect Express (PCIe)-based protocol.

Example 49 may include the subject matter of any one of examples 34-48, where the first size includes a size corresponding to a worst case elasticity buffer size for the link.

Example 50 is a system including a first device including a first clock, a second device including a second clock, where the first device is connected to the second device by a link, and a retimer device positioned between the first and second devices on the link. The retimer includes an elasticity buffer to add or subtract particular data buffered in the elasticity buffer to compensate for different frequencies of the first and second clocks, a receiver to receive a data stream to be sent between from the first device to the second device on the link, and a controller. The controller may determine, from the data stream, a modification to a characteristic of the link, and cause size of the elasticity buffer to be changed based on the modification.

Example 51 may include the subject matter of example 50, where the retimer device further includes retimer logic to regenerate the data stream received from the first device, and send the regenerated data stream to the second device.

Example 52 may include the subject matter of any one of examples 50-51, where the controller includes a controller according to a Physical Interface for PCI Express (PIPE)-based interface.

Example 53 may include the subject matter of any one of examples 50-52, where the characteristic includes link width of the link.

Example 54 may include the subject matter of example 53, where the size of the elasticity buffer is to be decreased in response to an increase in the link width and decreased in response to a decrease in the link width.

Example 55 may include the subject matter of any one of examples 50-52, where the characteristic includes a change to a clocking mode applied at clocks of the two devices.

Example 56 may include the subject matter of example 55, where the change to the clocking mode includes enabling or disabling spread spectrum modulation at the clocks.

Example 57 may include the subject matter of any one of examples 50-56, where the controller is further to determine a second modification to another characteristic of the link based on a sideband message sent from one of the two devices to the retimer, and cause another change to the size of the elasticity buffer based on the second modification.

Example 58 may include the subject matter of example 57, where the second modification includes a modification to a maximum packet size supported on the link.

Example 59 may include the subject matter of any one of examples 50-58, where the size of the elasticity buffer is to be changed in a link training phase of the link.

Example 60 may include the subject matter of example 59, where the data stream is received during the link training phase, the data stream includes one or more ordered sets, and the modification is determined from the one or more ordered sets.

Example 61 may include the subject matter of example 59, where the data stream is received during an active link state of the link and causing the size of the elasticity buffer to be changed from the first size to the second size includes forcing a reset of the link to cause the link training phase, and completing the change to the size of the elasticity buffer during the link training phase.

Example 62 may include the subject matter of example 61, where forcing the reset of the link includes changing particular data in the data stream received from a first one of the two devices to a particular value, and sending the changed particular data to the second one of the two devices, where the particular value artificially causes an error condition on the link.

Example 63 may include the subject matter of any one of examples 50-62, where the elasticity buffer is to add or subtract data from particular ordered sets sent recurrently in the data stream and buffered at the elasticity buffer.

Example 64 may include the subject matter of example 63, where the particular ordered sets are defined according to a particular protocol specification for use in compensating for different bit rates of devices on a link.

Example 65 may include the subject matter of example 64, where the particular ordered sets include SKP ordered sets.

Example 66 may include the subject matter of any one of examples 64-65, where the particular protocol specification includes a specification of one of a Universal Serial Bus (USB)-based protocol or a Peripheral Component Interconnect Express (PCIe)-based protocol.

Example 67 may include the subject matter of any one of examples 50-66, where the first size includes a size corresponding to a worst case elasticity buffer size for the link.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A retimer device comprising:
retimer logic to:
    receive a first signal from a first device and regenerate the first signal to send to a second device; and
    receive a second signal from the second device and regenerate the second signal to send to the first device, wherein the first device comprises a processor device;
an elasticity buffer to compensate for different bit rates of the first and second devices, wherein the retimer device is to be positioned between the two devices on a link; and
a controller to:
    monitor the first signal;
    determine, from the first signal, a modification to one or more characteristics of the link; and
    cause size of the elasticity buffer to be changed from a first size to a second size based on the modification.

2. The retimer device of claim 1, wherein the protocol activity comprises equalization of a link comprising the first device, the second device, and the retimer, and the retimer device is between the first and second devices in the link.

3. The retimer device of claim 2, wherein the first signal identifies that equalization of the link is to be performed, and the protocol logic is further to:
receive an equalization signal from the second device;
determine whether errors are present in the equalization signal; and
generate a metric based on whether errors are present in the equalization signal, wherein a sideband interface is used to provide the metric to the first device.

4. The retimer device of claim 1, further comprising receiver detection logic to:
detect that another device connects to a transmitter of the retimer device; and
selectively enable a termination of a receiver of the retimer device, wherein termination of the receiver is to indicate to the first device that the other device is connected to the transmitter of the retimer device and the other device comprises the second device.

5. The retimer of claim 4, wherein receiver detection logic is further to enter a receiver detect state defined in a state machine of a protocol and detects that the other device connects to the transmitter during the receiver detection state.

6. The retimer of claim 1, further comprising protocol logic is to support a plurality of protocol activities for a plurality of different protocols.

7. The retimer of claim 6, wherein the protocol logic comprises less than an entire protocol stack of one of the plurality of different protocols.

8. The retimer of claim 6, wherein the plurality of protocol activities comprises a speed change and the retimer is to operate a different speed as a result of the speed change.

9. A method comprising:
receiving a signal from a processor at a retimer on a link, wherein the retimer comprises an elasticity buffer to compensate for different bit rates of devices on the link;
regenerating the signal;
sending the regenerated signal to another device on the link;
identifying, from the signal, a modification to one or more characteristics of the link; and
changing the elasticity buffer from a first size to a second size based on the modification.

10. A system comprising:
a processor device;
a second device coupled to the processor device by a link; and
a retimer device positioned between the processor device and the second device on the link, the retimer device comprising:
a protocol stack comprising physical layer logic to perform one or more protocol specific events;
an elasticity buffer to compensate for different bit rates of the processor and second devices; and
a controller to:
determine a modification to one or more characteristics of the link; and
change the elasticity buffer from a first size to a second size based on the modification.

11. The system of claim 10, wherein the second device comprises a second processor device.

12. The retimer device of claim 1, wherein the one or more characteristics comprises link width of the link.

13. The retimer device of claim 12, wherein the size of the elasticity buffer is to be decreased in response to an increase in the link width and decreased in response to a decrease in the link width.

14. The retimer device of claim 1, wherein the modification comprises a change to a clocking mode applied at clocks of the two devices.

15. The retimer device of claim 14, wherein the change to the clocking mode comprises enabling or disabling spread spectrum modulation at the clocks.

16. The retimer device of claim 1, wherein the controller is further to:
determine a second modification to another characteristic of the link based on a sideband message sent from one of the two devices to the retimer; and
cause another change to the size of the elasticity buffer based on the second modification.

17. The retimer device of claim 16, wherein the second modification comprises a modification to a maximum packet size supported on the link.

18. The retimer device of claim 1, wherein the size of the elasticity buffer is to be changed in a link training phase of the link.

19. The retimer device of claim 1, wherein the particular protocol specification comprises a specification of one of a Universal Serial Bus (USB)-based protocol or a Peripheral Component Interconnect Express (PCIe)-based protocol.

20. The retimer device of claim 1, wherein the first size comprises a size corresponding to a worst-case elasticity buffer size for the link.

* * * * *